(12) United States Patent
Iyer et al.

(10) Patent No.: US 10,152,446 B2
(45) Date of Patent: Dec. 11, 2018

(54) LINK-PHYSICAL LAYER INTERFACE ADAPTER

(71) Applicant: Intel Corporation, Santa Clara, CA (US)

(72) Inventors: Venkatraman Iyer, Round Rock, TX (US); Mahesh Wagh, Portland, OR (US); William R. Halleck, Lancaster, MA (US); Rahul R. Shah, Marlborough, MA (US)

(73) Assignee: Intel Corporation, Santa Clara, CA (US)

( * ) Notice: Subject to any disclaimer, the term of this patent is extended or adjusted under 35 U.S.C. 154(b) by 70 days.

(21) Appl. No.: 15/283,309

(22) Filed: Oct. 1, 2016

(65) Prior Publication Data

US 2018/0095923 A1 Apr. 5, 2018

(51) Int. Cl.
*G06F 13/38* (2006.01)
*G06F 13/36* (2006.01)
*G06F 13/40* (2006.01)
*G06F 13/42* (2006.01)
*G11C 27/04* (2006.01)

(52) U.S. Cl.
CPC .......... *G06F 13/4068* (2013.01); *G06F 13/36* (2013.01); *G06F 13/4022* (2013.01); *G06F 13/4027* (2013.01); *G06F 13/4265* (2013.01); *G11C 27/04* (2013.01)

(58) Field of Classification Search
CPC .......... G06F 13/36; G06F 13/38; G06F 13/40
See application file for complete search history.

(56) References Cited

U.S. PATENT DOCUMENTS

| 6,850,523 | B1 * | 2/2005 | Karr | ................. H04L 29/06 370/389 |
| 7,376,147 | B2 | 5/2008 | Seto et al. | |
| 2003/0084029 | A1 * | 5/2003 | Fanning | .................. H04L 1/16 |
| 2012/0079159 | A1 * | 3/2012 | Rajwar | .............. G06F 1/3206 710/309 |
| 2014/0006670 | A1 | 1/2014 | Wagh | |
| 2015/0134866 | A1 | 5/2015 | Ranganathan et al. | |
| 2016/0267048 | A1 | 9/2016 | Pethe et al. | |

FOREIGN PATENT DOCUMENTS

EP 2437416 A2 4/2012
WO 2018063740 A1 4/2018

OTHER PUBLICATIONS

International Search Report and Written Opinion in International Application No. PCT/US2017/049824, dated Nov. 30, 2017, 9 pages.

\* cited by examiner

*Primary Examiner* — David E Martinez
(74) *Attorney, Agent, or Firm* — Alliance IP, LLC

(57) ABSTRACT

An interface adapter to identify a first ready signal from a first link layer-to-physical layer (LL-PHY) interface of a first communication protocol indicating readiness of a physical layer of the first protocol to accept link layer data. The interface adapter generates a second ready signal compatible with a second LL-PHY interface of a second communication protocol to cause link layer data to be sent from a link layer of the second communication protocol according to a predefined delay. A third ready signal is generated compatible with the first LL-PHY interface to indicate to the physical layer of the first communication protocol that the link layer data is to be sent. The interface adapter uses a shift register to cause the link layer data to be passed to the physical layer according to the predefined delay.

11 Claims, 20 Drawing Sheets

LINK-PHYSICAL LAYER INTERFACE ADAPTER

FIELD

This disclosure pertains to computing system, and in particular (but not exclusively) to point-to-point interconnects.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

Like reference numbers and designations in the various drawings indicate like elements.

DETAILED DESCRIPTION

Figure 1:
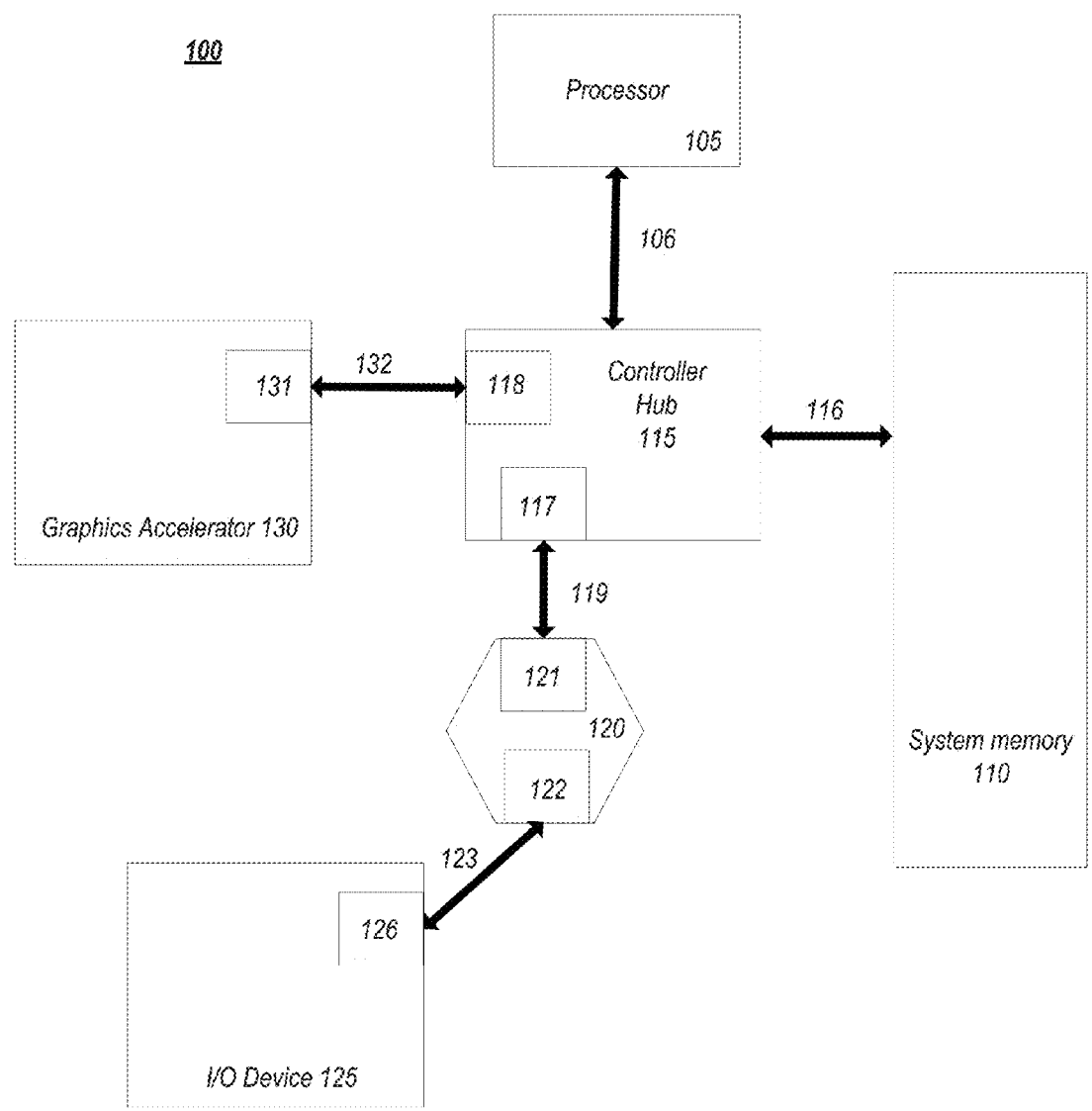
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
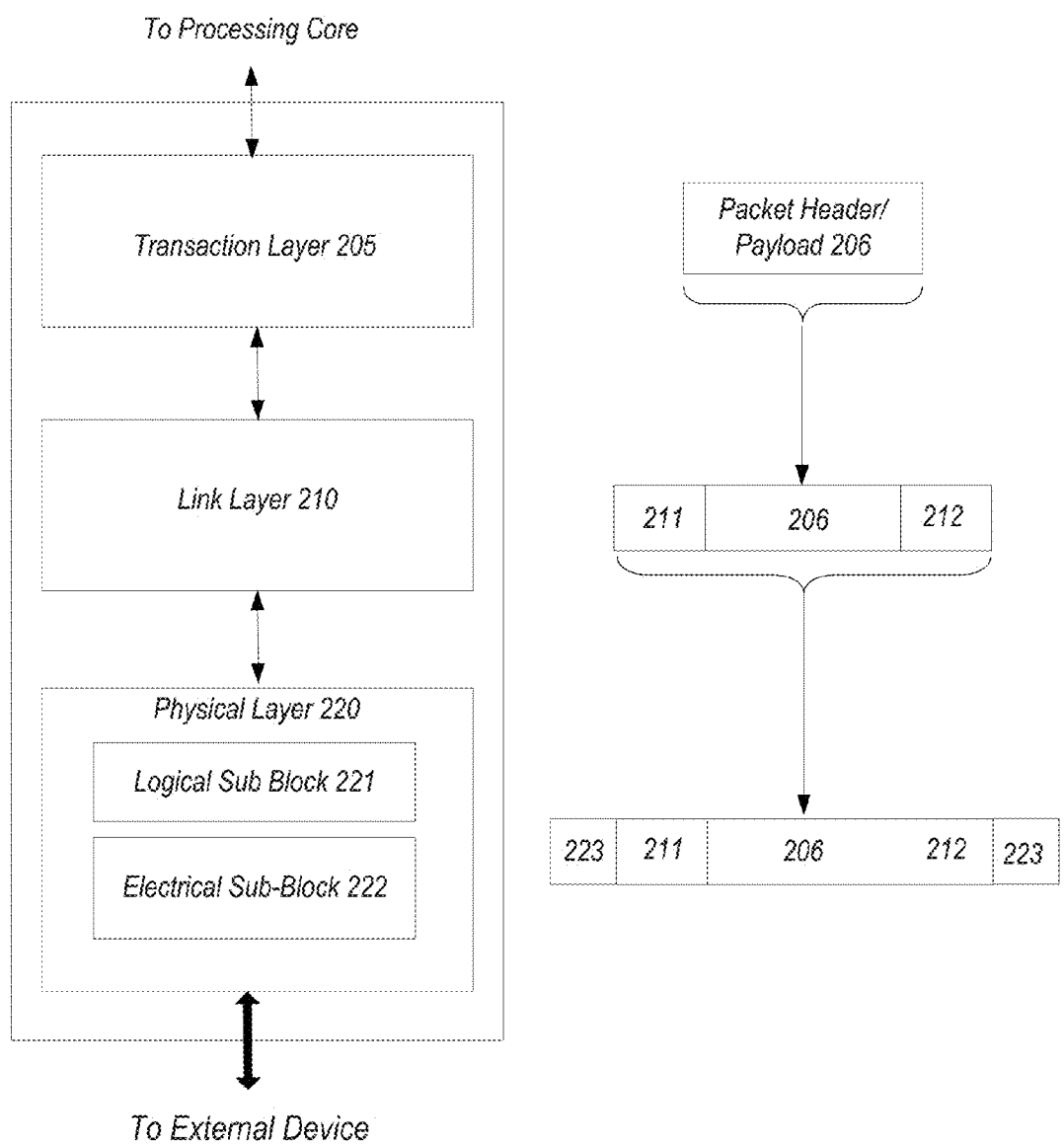
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCie stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
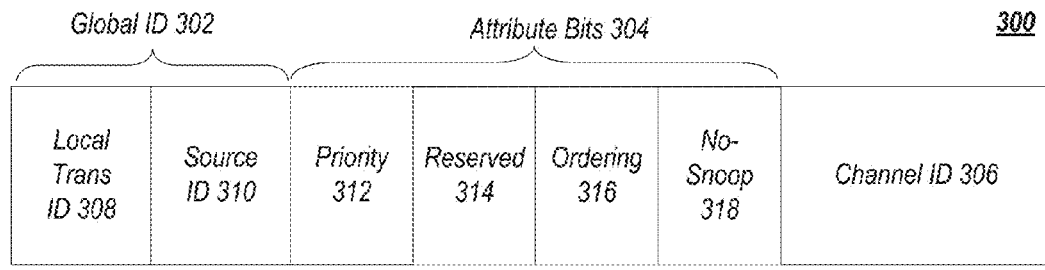
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
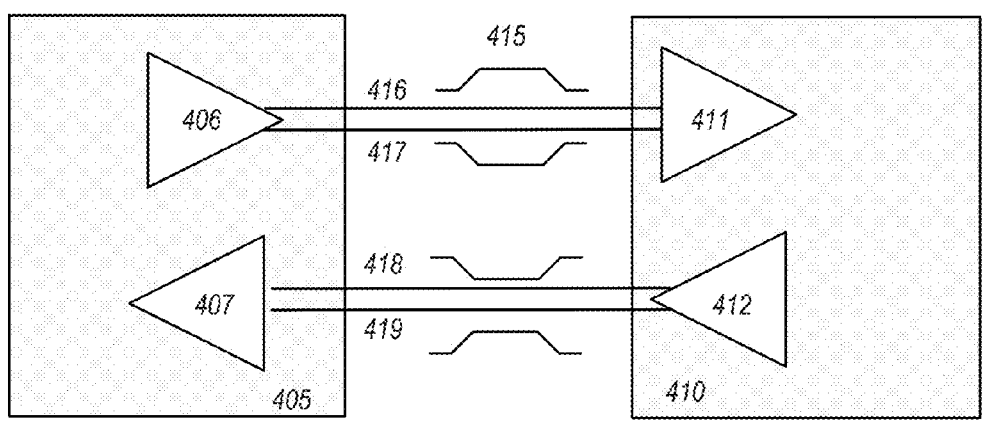
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In one embodiment, Ultra Path Interconnect (UPI) may be utilized to interconnect two or more devices. UPI can implement a next-generation cache-coherent, link-based interconnect. As one example, UPI may be utilized in high performance computing platforms, such as workstations or servers, including in systems where PCIe or another interconnect protocol is typically used to connect processors, accelerators, I/O devices, and the like. However, UPI is not so limited. Instead, UPI may be utilized in any of the systems or platforms described herein. Furthermore, the individual ideas developed may be applied to other interconnects and platforms, such as PCIe, MIPI, QPI, etc.

Figure 5:
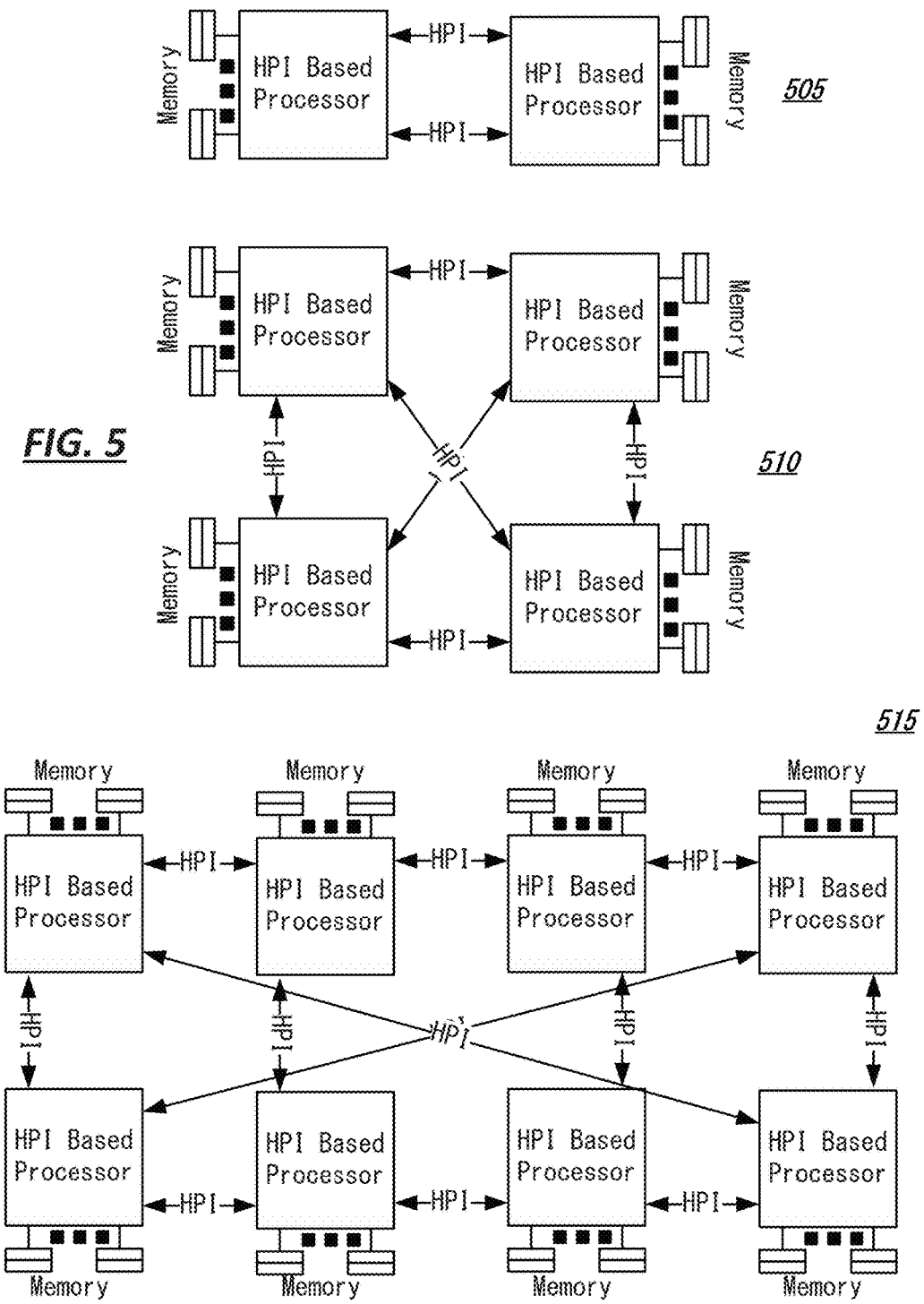
FIG. 5 illustrates embodiments of potential High Performance Interconnect (HPI) system configurations.

To support multiple devices, in one example implementation, UPI can include an Instruction Set Architecture (ISA) agnostic (i.e. UPI is able to be implemented in multiple different devices). In another scenario, UPI may also be utilized to connect high performance I/O devices, not just processors or accelerators. For example, a high performance PCIe device may be coupled to UPI through an appropriate translation bridge (i.e. UPI to PCIe). Moreover, the UPI links may be utilized by many UPI based devices, such as processors, in various ways (e.g. stars, rings, meshes, etc.). FIG. 5 illustrates example implementations of multiple potential multi-socket configurations. A two-socket configuration 505, as depicted, can include two UPI links; however, in other implementations, one UPI link may be utilized. For larger topologies, any configuration may be utilized as long as an identifier (ID) is assignable and there is some form of virtual path, among other additional or substitute features. As shown, in one example, a four socket configuration 510 has an UPI link from each processor to another. But in the eight socket implementation shown in configuration 515, not every socket is directly connected to each other through an UPI link. However, if a virtual path or channel exists between the processors, the configuration is supported. A range of supported processors includes 2-32 in a native domain. Higher numbers of processors may be reached through use of multiple domains or other interconnects between node controllers, among other examples.

The UPI architecture includes a definition of a layered protocol architecture, including in some examples, protocol layers (coherent, non-coherent, and, optionally, other memory based protocols), a routing layer, a link layer, and a physical layer. Furthermore, UPI can further include enhancements related to power managers (such as power control units (PCUs)), design for test and debug (DFT), fault handling, registers, security, among other examples. FIG. 5 illustrates an embodiment of an example UPI layered protocol stack. In some implementations, at least some of the layers illustrated in FIG. 5 may be optional. Each layer deals with its own level of granularity or quantum of information (the protocol layer 620a,b with packets 630, link layer 610a,b with flits 635, and physical layer 605a,b with phits 640). Note that a packet, in some embodiments, may include partial flits, a single flit, or multiple flits based on the implementation.

As a first example, a width of a phit 640 includes a 1 to 1 mapping of link width to bits (e.g. 20 bit link width includes a phit of 20 bits, etc.). Flits may have a greater size, such as 184, 192, or 200 bits. Note that if phit 640 is 20 bits wide and the size of flit 635 is 184 bits then it takes a fractional number of phits 640 to transmit one flit 635 (e.g. 9.2 phits at 20 bits to transmit an 184 bit flit 635 or 9.6 at 20 bits to transmit a 192 bit flit, among other examples). Note that widths of the fundamental link at the physical layer may vary. For example, the number of lanes per direction may include 2, 4, 6, 8, 10, 12, 14, 16, 18, 20, 22, 24, etc. In one embodiment, link layer 610a,b is capable of embedding multiple pieces of different transactions in a single flit, and one or multiple headers (e.g. 1, 2, 3, 4) may be embedded within the flit. In one example, UPI splits the headers into corresponding slots to enable multiple messages in the flit destined for different nodes.

Physical layer 605a,b, in one embodiment, can be responsible for the fast transfer of information on the physical medium (electrical or optical etc.). The physical link can be point-to-point between two Link layer entities, such as layer 605a and 605b. The Link layer 610a,b can abstract the Physical layer 605a,b from the upper layers and provides the capability to reliably transfer data (as well as requests) and manage flow control between two directly connected entities. The Link Layer can also be responsible for virtualizing the physical channel into multiple virtual channels and message classes. The Protocol layer 620a,b relies on the Link layer 610a,b to map protocol messages into the appropriate message classes and virtual channels before handing them to the Physical layer 605a,b for transfer across the physical links. Link layer 610*a,b* may support multiple messages, such as a request, snoop, response, writeback, non-coherent data, among other examples.

Figure 6:
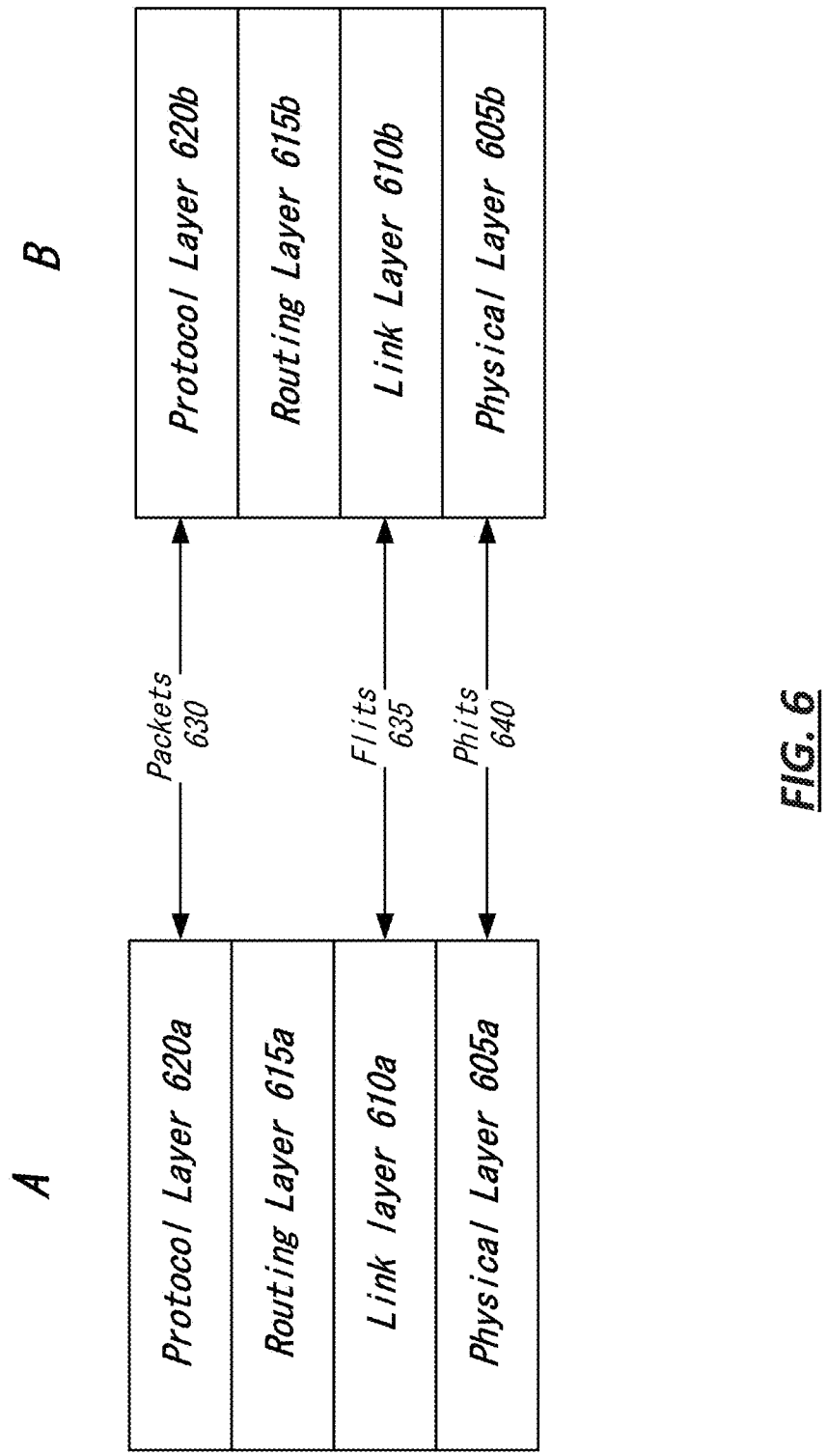
FIG. 6 illustrates an embodiment of a layered protocol stack associated with HPI.

The Physical layer 605*a,b* (or PHY) of UPI can be implemented above the electrical layer (i.e. electrical conductors connecting two components) and below the link layer 610*a,b*, as illustrated in FIG. 6. The Physical layer and corresponding logic can reside on each agent and connects the link layers on two agents (A and B) separated from each other (e.g. on devices on either side of a link). The local and remote electrical layers are connected by physical media (e.g. wires, conductors, optical, etc.). The Physical layer 605*a,b*, in one embodiment, has two major phases, initialization and operation. During initialization, the connection is opaque to the link layer and signaling may involve a combination of timed states and handshake events. During operation, the connection is transparent to the link layer and signaling is at a speed, with all lanes operating together as a single link. During the operation phase, the Physical layer transports flits from agent A to agent B and from agent B to agent A. The connection is also referred to as a link and abstracts some physical aspects including media, width and speed from the link layers while exchanging flits and control/status of current configuration (e.g. width) with the link layer. The initialization phase includes minor phases e.g. Polling, Configuration. The operation phase also includes minor phases (e.g. link power management states).

In one embodiment, Link layer 610*a,b* can be implemented so as to provide reliable data transfer between two protocol or routing entities. The Link layer can abstract Physical layer 605*a,b* from the Protocol layer 620*a,b*, and can be responsible for the flow control between two protocol agents (A, B), and provide virtual channel services to the Protocol layer (Message Classes) and Routing layer (Virtual Networks). The interface between the Protocol layer 620*a,b* and the Link Layer 610*a,b* can typically be at the packet level. In one embodiment, the smallest transfer unit at the Link Layer is referred to as a flit which a specified number of bits, such as 192 bits or some other denomination. The Link Layer 610*a,b* relies on the Physical layer 605*a,b* to frame the Physical layer's 605*a,b* unit of transfer (phit) into the Link Layer's 610*a,b* unit of transfer (flit). In addition, the Link Layer 610*a,b* may be logically broken into two parts, a sender and a receiver. A sender/receiver pair on one entity may be connected to a receiver/sender pair on another entity. Flow Control is often performed on both a flit and a packet basis. Error detection and correction is also potentially performed on a flit level basis.

In one embodiment, Routing layer 615*a,b* can provide a flexible and distributed method to route UPI transactions from a source to a destination. The scheme is flexible since routing algorithms for multiple topologies may be specified through programmable routing tables at each router (the programming in one embodiment is performed by firmware, software, or a combination thereof). The routing functionality may be distributed; the routing may be done through a series of routing steps, with each routing step being defined through a lookup of a table at either the source, intermediate, or destination routers. The lookup at a source may be used to inject a UPI packet into the UPI fabric. The lookup at an intermediate router may be used to route an UPI packet from an input port to an output port. The lookup at a destination port may be used to target the destination UPI protocol agent. Note that the Routing layer, in some implementations, can be thin since the routing tables, and, hence the routing algorithms, are not specifically defined by specification. This allows for flexibility and a variety of usage models, including flexible platform architectural topologies to be defined by the system implementation. The Routing layer 615*a,b* relies on the Link layer 610*a,b* for providing the use of up to three (or more) virtual networks (VNs)—in one example, two deadlock-free VNs, VN0 and VN1 with several message classes defined in each virtual network. A shared adaptive virtual network (VNA) may be defined in the Link layer, but this adaptive network may not be exposed directly in routing concepts, since each message class and virtual network may have dedicated resources and guaranteed forward progress, among other features and examples.

In some implementations, UPI can utilize an embedded clock. A clock signal can be embedded in data transmitted using the interconnect. With the clock signal embedded in the data, distinct and dedicated clock lanes can be omitted. This can be useful, for instance, as it can allow more pins of a device to be dedicated to data transfer, particularly in systems where space for pins is at a premium.

A link can be established between two agents on either side of an interconnect. An agent sending data can be a local agent and the agent receiving the data can be a remote agent. State machines can be employed by both agents to manage various aspects of the link. In one embodiment, the Physical layer datapath can transmit flits from the link layer to the electrical front-end. The control path, in one implementation, includes a state machine (also referred to as a link training state machine or the similar). The state machine's actions and exits from states may depend on internal signals, timers, external signals or other information. In fact, some of the states, such as a few initialization states, may have timers to provide a timeout value to exit a state. Note that detect, in some embodiments, refers to detecting an event on both legs of a lane; but not necessarily simultaneously. However, in other embodiments, detect refers to detection of an event by an agent of reference. Debounce, as one example, refers to sustained assertion of a signal. In one embodiment, UPI supports operation in the event of non-function lanes. Here, lanes may be dropped at specific states.

Figure 7:
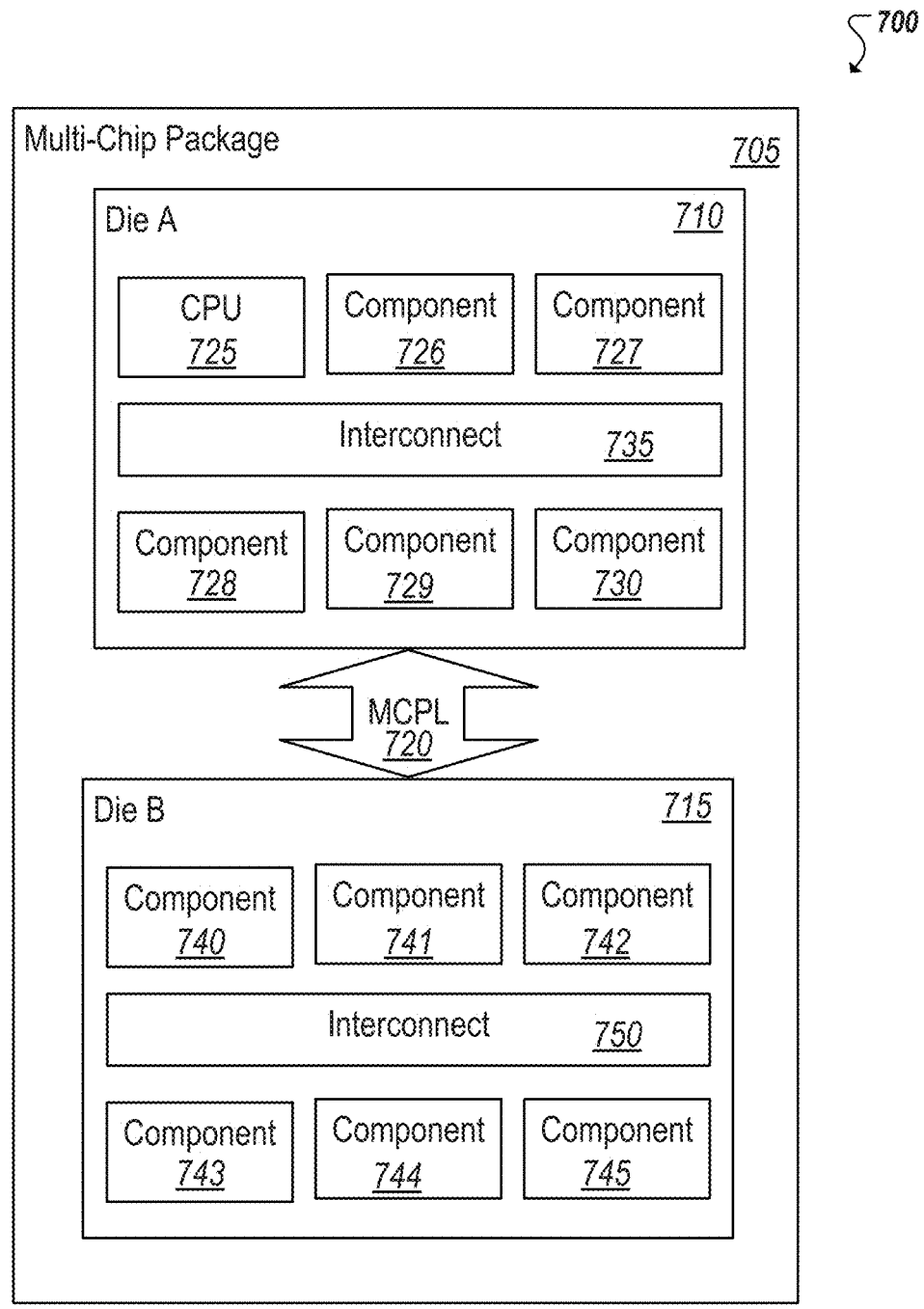
FIG. 7 illustrates an embodiment of a multichip package.

FIG. 7 is a simplified block diagram 700 illustrating an example multi-chip package 705 that includes two or more chips, or dies, (e.g., 710, 715) communicatively connected using an example multi-chip package link (MCPL) 720. While FIG. 7 illustrates an example of two (or more) dies that are interconnected using an example MCPL 720, it should be appreciated that the principles and features described herein regarding implementations of an MCPL can be applied to any interconnect or link connecting a die (e.g., 710) and other components, including connecting two or more dies (e.g., 710, 715), connecting a die (or chip) to another component off-die, connecting a die to another device or die off-package (e.g., 705), connecting die to a BGA package, implementation of a Patch on Interposer (POINT), among potentially other examples.

Generally, a multichip package (e.g., 705) can be an electronic package where multiple integrated circuits (ICs), semiconductor dies or other discrete components (e.g., 710, 715) are packaged onto a unifying substrate (e.g., silicon or other semiconductor substrate), facilitating the combined components' use as a single component (e.g., as though a larger IC). In some instances, the larger components (e.g., dies 710, 715) can themselves be IC systems, such as systems on chip (SoC), multiprocessor chips, or other components that include multiple components (e.g., 725-730 and 740-745) on the device, for instance, on a single die (e.g., 710, 715). Multichip packages 705 can provide flexibility for building complex and varied systems from potentially multiple discrete components and systems. For instance, each of dies 710, 715 may be manufactured or otherwise provided by two different entities, with the silicon substrate of the package 705 provided by yet a third entity, among many other examples. Further, dies and other components within a multichip package 705 can themselves include interconnect or other communication fabrics (e.g., 735, 750) providing the infrastructure for communication between components (e.g., 725-730 and 740-745) within the device (e.g., 710, 715 respectively). The various components and interconnects (e.g., 735, 750) may potentially support or use multiple different protocols. Further, communication between dies (e.g., 710, 715) can potentially include transactions between the various components on the dies over multiple different protocols. Designing mechanisms to provide communication between chips (or dies) on a multichip package can be challenging, with traditional solutions employing highly specialized, expensive, and package-specific solutions based on the specific combinations of components (and desired transactions) sought to be interconnected.

The examples, systems, algorithms, apparatus, logic, and features described within this Specification can address at least some of the issues identified above, including potentially many others not explicitly mentioned herein. For instance, in some implementations, a high bandwidth, low power, low latency interface can be provided to connect a host device (e.g., a CPU) or other device to a companion chip that sits in the same package as the host. Such a multichip package link (MCPL) can support multiple package options, multiple I/O protocols, as well as Reliability, Availability, and Serviceability (RAS) features. Further, the physical layer (PHY) can include an electrical layer and logic layer and can support longer channel lengths, including channel lengths up to, and in some cases exceeding, approximately 45 mm. In some implementations, an example MCPL can operate at high data rates, including data rates exceeding 8-10 Gb/s.

In one example implementation of an MCPL, a PHY electrical layer can improve upon traditional multi-channel interconnect solutions (e.g., multi-channel DRAM I/O), extending the data rate and channel configuration, for instance, by a number of features including, as examples, regulated mid-rail termination, low power active crosstalk cancellation, circuit redundancy, per bit duty cycle correction and deskew, line coding, and transmitter equalization, among potentially other examples.

In one example implementation of an MCPL, a PHY logical layer can be implemented that can further assist (e.g., electrical layer features) in extending the data rate and channel configuration while also enabling the interconnect to route multiple protocols across the electrical layer. Such implementations can provide and define a modular common physical layer that is protocol agnostic and architected to work with potentially any existing or future interconnect protocol.

Figure 8:
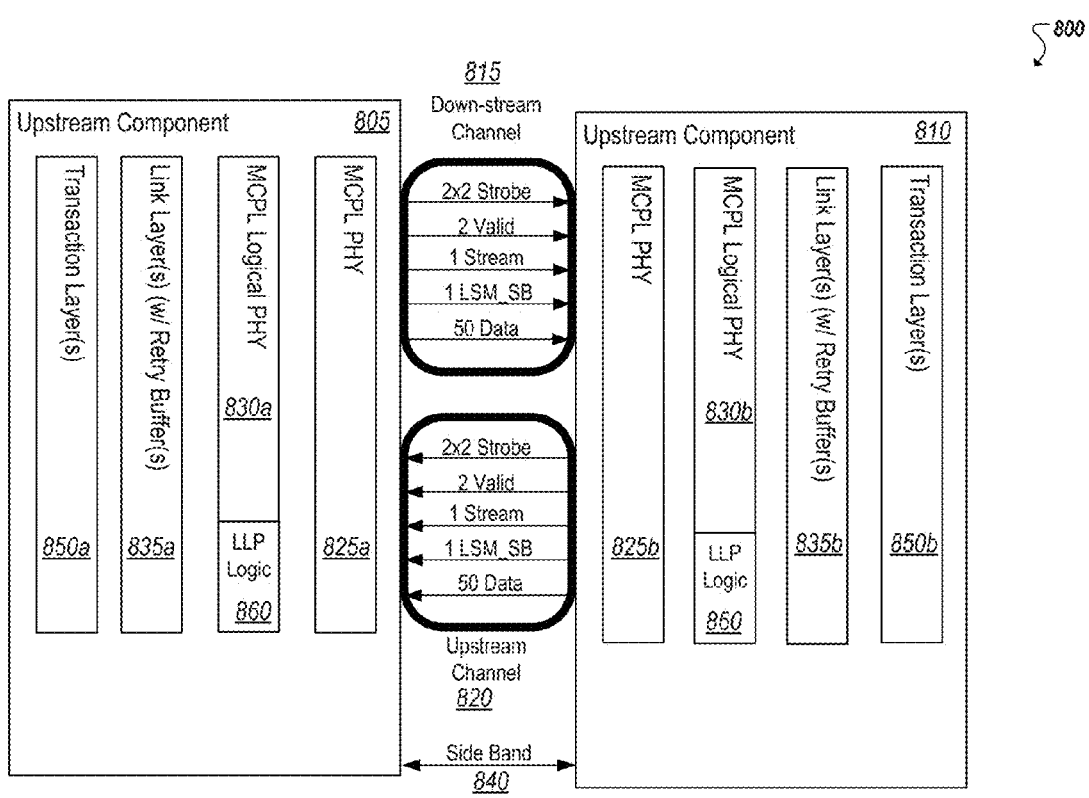
FIG. 8 is a simplified block diagram of a multichip package link (MCPL).

Turning to FIG. 8, a simplified block diagram 800 is shown representing at least a portion of a system including an example implementation of a multichip package link (MCPL). An MCPL can be implemented using physical electrical connections (e.g., wires implemented as lanes) connecting a first device 805 (e.g., a first die including one or more sub-components) with a second device 810 (e.g., a second die including one or more other sub-components). In the particular example shown in the high-level representation of diagram 800, all signals (in channels 815, 820) can be unidirectional and lanes can be provided for the data signals to have both an upstream and downstream data transfer. While the block diagram 800 of FIG. 8, refers to the first component 805 as the upstream component and the second component 810 as the downstream components, and physical lanes of the MCPL used in sending data as a downstream channel 815 and lanes used for receiving data (from component 810) as an upstream channel 820, it should be appreciated that the MCPL between devices 805, 810 can be used by each device to both send and receive data between the devices.

In one example implementation, an MCPL can provide a physical layer (PHY) including the electrical MCPL PHY 825a,b (or, collectively, 825) and executable logic implementing MCPL logical PHY 830a,b (or, collectively, 830). Electrical, or physical, PHY 825 can provide the physical connection over which data is communicated between devices 805, 810. Signal conditioning components and logic can be implemented in connection with the physical PHY 825 in order to establish high data rate and channel configuration capabilities of the link, which in some applications can involve tightly clustered physical connections at lengths of approximately 45 mm or more. The logical PHY 830 can include logic for facilitating clocking, link state management (e.g., for link layers 835a, 835b), and protocol multiplexing between potentially multiple, different protocols used for communications over the MCPL.

In one example implementation, physical PHY 825 can include, for each channel (e.g., 815, 820) a set of data lanes, over which in-band data can be sent. In this particular example, 50 data lanes are provided in each of the upstream and downstream channels 815, 820, although any other number of lanes can be used as permitted by the layout and power constraints, desired applications, device constraints, etc. Each channel can further include one or more dedicated lanes for a strobe, or clock, signal for the channel, one or more dedicated lanes for a valid signal for the channel, one or more dedicated lanes for a stream signal, and one or more dedicated lanes for a link state machine management or sideband signal. The physical PHY can further include a sideband link 840, which, in some examples, can be a bi-directional lower frequency control signal link used to coordinate state transitions and other attributes of the MCPL connecting devices 805, 810, among other examples.

As noted above, multiple protocols can be supported using an implementation of MCPL. Indeed, multiple, independent transaction layers 850a, 850b can be provided at each device 805, 810. For instance, each device 805, 810 may support and utilize two or more protocols, such as PCI, PCIe, QPI, Intel In-Die Interconnect (IDI), among others. IDI is a coherent protocol used on-die to communicate between cores, Last Level Caches (LLCs), memory, graphics, and IO controllers. Other protocols can also be supported including Ethernet protocol, Infiniband protocols, and other PCIe fabric based protocols. The combination of the Logical PHY and physical PHY can also be used as a die-to-die interconnect to connect a SerDes PHY (PCIe, Ethernet, Infiniband or other high speed SerDes) on one Die to its upper layers that are implemented on the other die, among other examples.

Logical PHY 830 can support multiplexing between these multiple protocols on an MCPL. For instance, the dedicated stream lane can be used to assert an encoded stream signal that identifies which protocol is to apply to data sent substantially concurrently on the data lanes of the channel. Further, logical PHY 830 can be used to negotiate the various types of link state transitions that the various protocols may support or request. In some instances, LSM_SB signals sent over the channel's dedicated LSM_SB lane can be used, together with side band link 840 to communicate and negotiate link state transitions between the devices 805, 810. Further, link training, error detection, skew detection, de-skewing, and other functionality of traditional interconnects can be replaced or governed, in part using logical PHY 830. For instance, valid signals sent over one or more dedicated valid signal lanes in each channel can be used to signal link activity, detect skew, link errors, and realize other features, among other examples. In the particular example of FIG. 8, multiple valid lanes are provided per channel. For instance, data lanes within a channel can be bundled or clustered (physically and/or logically) and a valid lane can be provided for each cluster. Further, multiple strobe lanes can be provided, in some cases, also to provide a dedicated strobe signal for each cluster in a plurality of data lane clusters in a channel, among other examples.

As noted above, logical PHY 830 can be used to negotiate and manage link control signals sent between devices connected by the MCPL. In some implementations, logical PHY 830 can include link layer packet (LLP) generation logic 860 that can be used to send link layer control messages over the MCPL (i.e., in band). Such messages can be sent over data lanes of the channel, with the stream lane identifying that the data is link layer-to-link layer messaging, such as link layer control data, among other examples. Link layer messages enabled using LLP module 860 can assist in the negotiation and performance of link layer state transitioning, power management, loopback, disable, re-centering, scrambling, among other link layer features between the link layers 835a, 835b of devices 805, 810 respectively.

Figure 9:
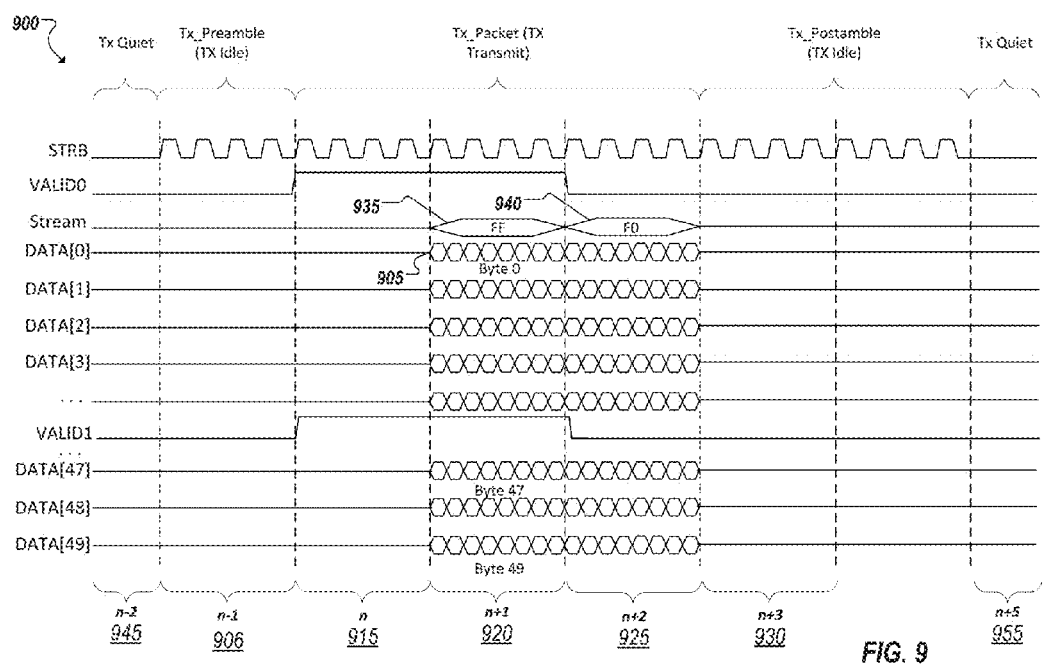
FIG. 9 is a representation of example signaling on an example MCPL.

Turning to FIG. 9, a diagram 900 is shown representing example signaling using a set of lanes (e.g., 815, 820) in a particular channel of an example MCPL. In the example of FIG. 9, two clusters of twenty-five (25) data lanes are provided for fifty (50) total data lanes in the channel. A portion of the lanes are shown, while others (e.g., DATA[4-46] and a second strobe signal lane (STRB)) are omitted (e.g., as redundant signals) for convenience in illustrating the particular example. When the physical layer is in an active state (e.g., not powered off or in a low power mode (e.g., an L1 state)), strobe lanes (STRB) can be provided with a synchronous clock signal. In some implementations, data can be sent on both the rising and falling edges of the strobe. Each edge (or half clock cycle) can demarcate a unit interval (UI). Accordingly, in this example, a bit (e.g., 905) can be sent on each lane, allowing for a byte to be sent every 8UI. A byte time period 910 can be defined as 8UI, or the time for sending a byte on a single one of the data lanes (e.g., DATA[0-49]).

In some implementations, a valid signal, sent on one or more dedicated valid signal channels (e.g., VALID0, VALID1), can serve as a leading indicator for the receiving device to identify, when asserted (high), to the receiving device, or sink, that data is being sent from the sending device, or source, on data lanes (e.g., DATA[0-49]) during the following time period, such as a byte time period 910. Alternatively, when the valid signal is low, the source indicates to the sink that the sink will not be sending data on the data lanes during the following time period. Accordingly, when the sink logical PHY detects that the valid signal is not asserted (e.g., on lanes VALID0 and VALID1), the sink can disregard any data that is detected on the data lanes (e.g., DATA[0-49]) during the following time period. For instance, cross talk noise or other bits may appear on one or more of the data lanes when the source, in fact, is not sending any data. By virtue of a low, or non-asserted, valid signal during the previous time period (e.g., the previous byte time period), the sink can determine that the data lanes are to be disregarded during the following time period.

Data sent on each of the lanes of the MCPL can be strictly aligned to the strobe signal. A time period can be defined based on the strobe, such as a byte time period, and each of these periods can correspond to a defined window in which signals are to be sent on the data lanes (e.g., DATA[0-49]), the valid lanes (e.g., VALID1, VALID2), and stream lane (e.g., STREAM). Accordingly, alignment of these signals can enable identification that a valid signal in a previous time period window applies to data in the following time period window, and that a stream signal applies to data in the same time period window. The stream signal can be an encoded signal (e.g., 1 byte of data for a byte time period window), that is encoded to identify the protocol that applies to data being sent during the same time period window.

To illustrate, in the particular example of FIG. 9, a byte time period window is defined. A valid is asserted at a time period window n (915), before any data is injected on data lanes DATA[0-49]. At the following time period window n+1 (920) data is sent on at least some of the data lanes. In this case, data is sent on all fifty data lanes during n+1 (920). Because a valid was asserted for the duration of the preceding time period window n (915), the sink device can validate the data received on data lanes DATA[0-49] during time period window n+1 (920). Additionally, the leading nature of the valid signal during time period window n (915) allows the receiving device to prepare for the incoming data. Continuing with the example of FIG. 9, the valid signal remains asserted (on VALID1 and VALID2) during the duration of time period window n+1 (920), causing the sink device to expect the data sent over data lanes DATA[0-49] during time period window n+2 (925). If the valid signal were to remain asserted during time period window n+2 (925), the sink device could further expect to receive (and process) additional data sent during an immediately subsequent time period window n+3 (930). In the example of FIG. 9, however, the valid signal is de-asserted during the duration of time period window n+2 (925), indicating to the sink device that no data will be sent during time period window n+3 (930) and that any bits detected on data lanes DATA [0-49] should be disregarded during time period window n+3 (930).

As noted above, multiple valid lanes and strobe lanes can be maintained per channel. This can assist, among other advantages, with maintaining circuit simplicity and synchronization amid the clusters of relatively lengthy physical lanes connecting the two devices. In some implementations, a set of data lanes can be divided into clusters of data lanes. For instance, in the example of FIG. 9, data lanes DATA[0-49] can be divided into two twenty-five lane clusters and each cluster can have a dedicated valid and strobe lane. For instance, valid lane VALID1 can be associated with data lanes DATA[0-24] and valid lane VALID2 can be associated with data lanes DATA[25-49]. The signals on each "copy" of the valid and strobe lanes for each cluster can be identical.

As introduced above, data on stream lane STREAM can be used to indicate to the receiving logical PHY what protocol is to apply to corresponding data being sent on data lanes data lanes DATA[0-49]. In the example of FIG. 9, a stream signal is sent on STREAM during the same time period window as data on data lanes DATA[0-49] to indicate the protocol of the data on the data lanes. In alternative implementations, the stream signal can be sent during a preceding time period window, such as with corresponding valid signals, among other potential modifications. However, continuing with the example of FIG. 9, a stream signal 935 is sent during time period window n+1 (920) that is encoded to indicate the protocol (e.g., PCIe, PCI, IDI, QPI, etc.) that is to apply to the bits sent over data lanes DATA[0-49] during time period window n+1 (920). Similarly, another stream signal 940 can be sent during the subsequent time period window n+2 (925) to indicate the protocol that applies to the bits sent over data lanes DATA [0-49] during time period window n+2 (925), and so on. In some cases, such as the example of FIG. 9 (where both stream signals 935, 940 have the same encoding, binary FF), data in sequential time period windows (e.g., n+1 (920) and n+2 (925)) can belong to the same protocol. However, in other cases, data in sequential time period windows (e.g., n+1 (920) and n+2 (925)) can be from different transactions to which different protocols are to apply, and stream signals (e.g., 935, 940) can be encoded accordingly to identify the different protocols applying to the sequential bytes of data on the data lanes (e.g., DATA[0-49]), among other examples.

In some implementations, a low power or idle state can be defined for the MCPL. For instance, when neither device on the MCPL is sending data, the physical layer (electrical and logical) of MCPL can go to an idle or low power state. For instance, in the example of FIG. 9, at time period window n−2 (945), the MCPL is in a quiet or idle state and the strobe is disabled to save power. The MCPL can transition out of low-power or idle mode, awaking the strobe at time period window time period window n−1 (e.g., 906). The strobe can complete a transmission preamble (e.g., to assist in waking and synchronizing each of the lanes of the channel, as well as the sink device), beginning the strobe signal prior to any other signaling on the other non-strobe lanes. Following this time period window n−1 (906), the valid signal can be asserted at time period window n (915) to notify the sink that data is forthcoming in the following time period window n+1 (920), as discussed above.

The MCPL may re-enter a low power or idle state (e.g., an L1 state) following the detection of idle conditions on the valid lanes, data lanes, and/or other lanes of the MCPL channel. For instance, no signaling may be detected beginning at time period window n+3 (930) and going forward. Logic on either the source or sink device can initiate transition back into a low power state leading again (e.g., time period window n+5 (955)) to the strobe going idle in a power savings mode, among other examples and principles (including those discussed later herein).

Electrical characteristics of the physical PHY can include one or more of single-ended signaling, half-rate forwarded clocking, matching of interconnect channel as well as on-chip transport delay of transmitter (source) and receiver (sink), optimized electrostatic discharge (ESD) protection, pad capacitance, among other features. Further, an MCPL can be implemented to achieve higher data rate (e.g., approaching 16 Gb/s) and energy efficiency characteristics than traditional package I/O solutions.

Additional features can also be optionally implemented in some examples of a MPL to enhance the performance characteristics of the physical link. For instance, line coding can be provided. While mid-rail terminations, such as described above, can allow for DC data bus inversion (DBI) to be omitted, AC DBI can still be used to reduce the dynamic power. More complicated coding can also be used to eliminate the worst case difference of 1's and 0's to reduce, for instance, the drive requirement of mid-rail regulator, as well as limit I/O switching noise, among other example benefits. Further, transmitter equalization can also be optionally implemented. For instance, at very high data rates, insertion loss can be a significant for an in-package channel. A two-tap weight transmitter equalization (e.g., performed during an initial power-up sequence) can, in some cases, be sufficient to mitigate some of these issues, among others.

Figure 10:
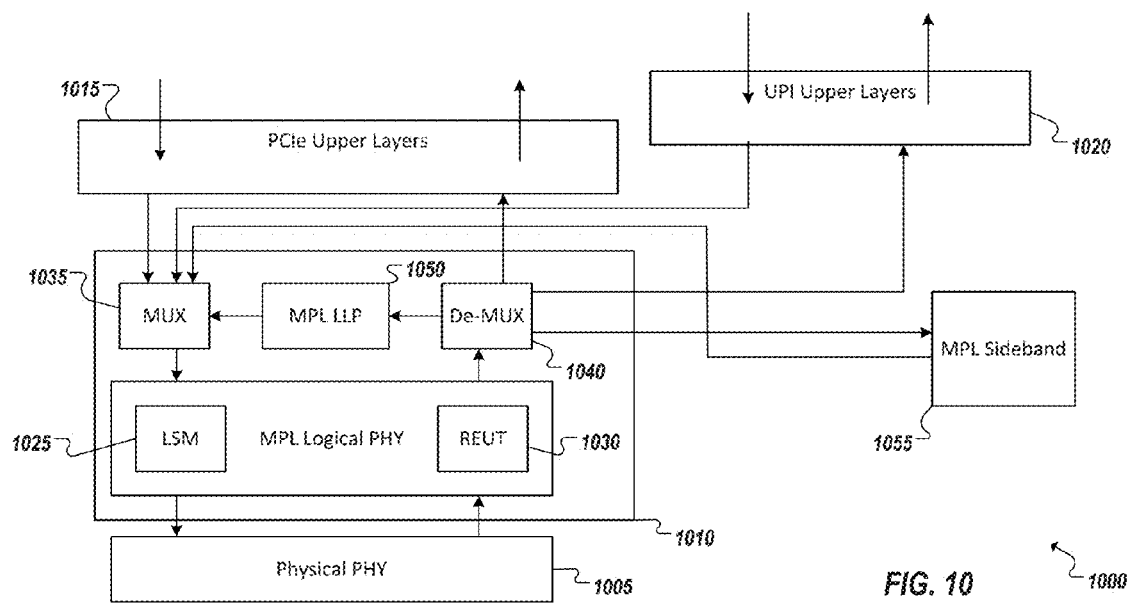
FIG. 10 is a simplified block diagram of an MCPL.

Turning to FIG. 10, a simplified block diagram 1000 is shown illustrating an example logical PHY of an example MCPL. A physical PHY 1005 can connect to a die that includes logical PHY 1010 and additional logic supporting a link layer of the MCPL. The die, in this example, can further include logic to support multiple different protocols on the MCPL. For instance, in the example of FIG. 10, PCIe logic 1015 can be provided as well as UPI logic 1020, such that the dies can communicate using either PCIe or IDI over the same MCPL connecting the two dies, among potentially many other examples, including examples where more than two protocols or protocols other than PCIe and IDI are supported over the MCPL. Various protocols supported between the dies can offer varying levels of service and features.

Logical PHY 1010 can include link state machine management logic 1025 for negotiating link state transitions in connection with requests of upper layer logic of the die (e.g., received over PCIe or IDI). Logical PHY 1010 can further include link testing and debug logic (e.g., 1030) ion some implementations. As noted above, an example MCPL can support control signals that are sent between dies over the MCPL to facilitate protocol agnostic, high performance, and power efficiency features (among other example features) of the MCPL. For instance, logical PHY 1010 can support the generation and sending, as well as the receiving and processing of valid signals, stream signals, and LSM sideband signals in connection with the sending and receiving of data over dedicated data lanes, such as described in examples above.

In some implementations, multiplexing (e.g., 1035) and demultiplexing (e.g., 1040) logic can be included in, or be otherwise accessible to, logical PHY 1010. For instance, multiplexing logic (e.g., 1035) can be used to identify data (e.g., embodied as packets, messages, etc.) that is to be sent out onto the MCPL. The multiplexing logic 1035 can identify the protocol governing the data and generate a stream signal that is encoded to identify the protocol. For instance, in one example implementation, the stream signal can be encoded as a byte of two hexadecimal symbols (e.g., IDI: FFh; PCIe: F0h; LLP: AAh; sideband: 55h; etc.), and can be sent during the same window (e.g., a byte time period window) of the data governed by the identified protocol. Similarly, demultiplexing logic 1040 can be employed to interpret incoming stream signals to decode the stream signal and identify the protocol that is to apply to data concurrently received with the stream signal on the data lanes. The demultiplexing logic 1040 can then apply (or ensure) protocol-specific link layer handling and cause the data to be handled by the corresponding protocol logic (e.g., PCIe logic 1015 or UPI logic 1020).

Logical PHY 1010 can further include link layer packet logic 1050 that can be used to handle various link control functions, including power management tasks, loopback, disable, re-centering, scrambling, etc. LLP logic 1050 can facilitate link layer-to-link layer messages over MCLP, among other functions. Data corresponding to the LLP signaling can be also be identified by a stream signal sent on a dedicated stream signal lane that is encoded to identify that the data lanes LLP data. Multiplexing and demultiplexing logic (e.g., 1035, 1040) can also be used to generate and interpret the stream signals corresponding to LLP traffic, as well as cause such traffic to be handled by the appropriate die logic (e.g., LLP logic 1050). Likewise, as some implementations of an MCLP can include a dedicated sideband (e.g., sideband 1055 and supporting logic), such as an asynchronous and/or lower frequency sideband channel, among other examples.

Logical PHY logic 1010 can further include link state machine management logic that can generate and receive (and use) link state management messaging over a dedicated LSM sideband lane. For instance, an LSM sideband lane can be used to perform handshaking to advance link training state, exit out of power management states (e.g., an L1 state), among other potential examples. The LSM sideband signal can be an asynchronous signal, in that it is not aligned with the data, valid, and stream signals of the link, but instead corresponds to signaling state transitions and align the link state machine between the two die or chips connected by the link, among other examples. Providing a dedicated LSM sideband lane can, in some examples, allow for traditional squelch and received detect circuits of an analog front end (AFE) to be eliminated, among other example benefits.

Figure 11:
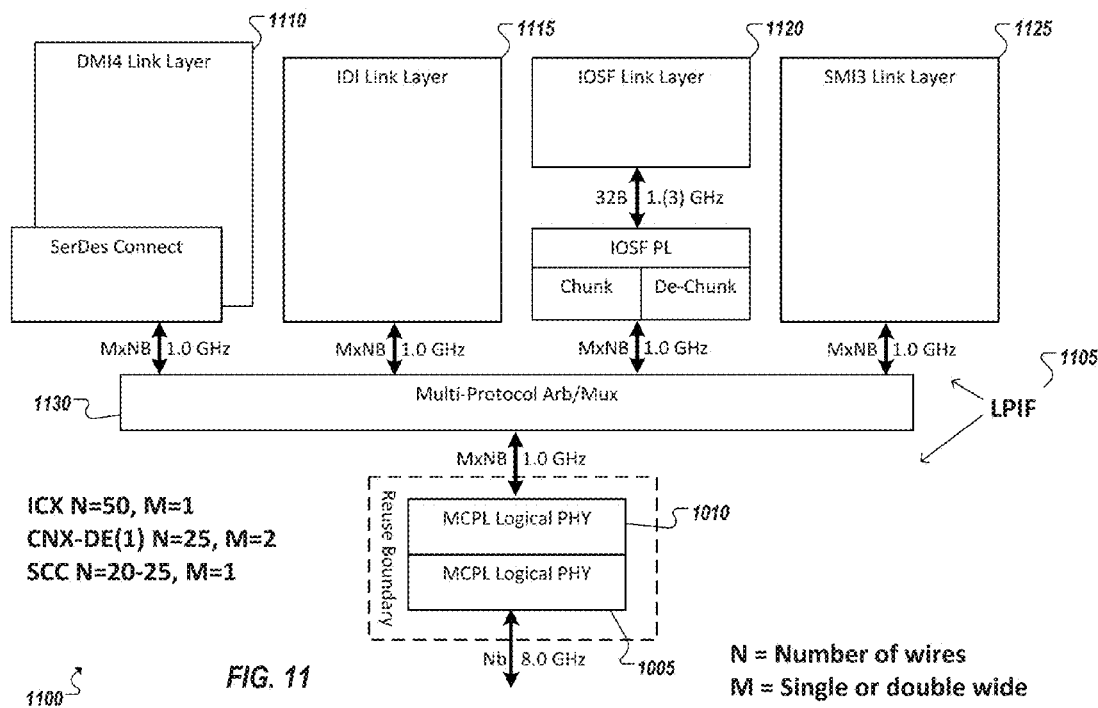
FIG. 11 is a simplified block diagram of an MCPL interfacing with upper layer logic of multiple protocols using a logical PHY interface (LPIF).

Turning to FIG. 11, a simplified block diagram 1100 is shown illustrating another representation of logic used to implement an MCPL. For instance, logical PHY 1010 is provided with a defined logical PHY interface (LPIF) 1105 through which any one of a plurality of different protocols (e.g., PCIe, IDI, QPI, etc.) 1110, 1115, 1120, 1125 and signaling modes (e.g., sideband) can interface with the physical layer of an example MCPL. In some implementations, multiplexing and arbitration logic 1130 can also be provided as a layer separate from the logical PHY 1010. In one example, the LPIF 1105 can be provided as the interface on either side of this MuxArb layer 1130. The logical PHY 1010 can interface with the physical PHY (e.g., the analog front end (AFE) 1005 of the MCPL PHY) through another interface.

The LPIF can abstract the PHY (logical and electrical/analog) from the upper layers (e.g., 1110, 1115, 1120, 1125) such that a completely different PHY can be implemented under LPIF transparent to the upper layers. This can assist in promoting modularity and re-use in design, as the upper layers can stay intact when the underlying signaling technology PHY is updated, among other examples. Further, the LPIF can define a number of signals enabling multiplexing/demultiplexing, LSM management, error detection and handling, and other functionality of the logical PHY. For instance, Table 1 summarizes at least a portion of signals that can be defined for an example LPIF:

TABLE 1

| Signal Name | Description |
| --- | --- |
| Rst | Reset |
| Lclk | Link Clock - 8UI of PHY clock |
| Pl_trdy | Physical Layer is ready to accept data, data is accepted by Physical layer when Pl_trdy and Lp_valid are both asserted. |
| Pl_data[N-1:0][7:0] | Physical Layer-to-Link Layer data, where N equals the number of lanes. |
| Pl_valid | Physical Layer-to-Link Layer signal indicating data valid |
| Pl_Stream[7:0] | Physical Layer-to-Link Layer signal indicating the stream ID received with received data |
| Pl_error | Physical layer detected an error (e.g., framing or training) |
| Pl_AlignReq | Physical Layer request to Link Layer to align packets at LPIF width boundary |
| Pl_in_L0 | Indicates that link state machine (LSM) is in L0 |
| Pl_in_retrain | Indicates that LSM is in Retrain/Recovery |
| Pl_rejectL1 | Indicates that the PHY layer has rejected entry into L1. |
| Pl_in_L12 | Indicates that LSM is in L1 or L2. |
| Pl_LSM (3:0) | Current LSM state information |
| Lp_data[N-1:0][7:0] | Link Layer-to-Physical Layer Data, where N equals number of lanes. |
| Lp_Stream[7:0] | Link Layer-to-Physical Layer signal indicating the stream ID to use with data |
| Lp_AlignAck | Link Layer to Physical layer indicates that the packets are aligned LPIF width boundary |
| Lp_valid | Link Layer-to-Physical Layer signal indicating data valid |
| Lp_enterL1 | Link Layer Request to Physical Layer to enter L1 |
| Lp_enterL2 | Link Layer Request to Physical Layer to enter L2 |
| Lp_Retrain | Link Layer Request to Physical Layer to Retrain the PHY |
| Lp_exitL12 | Link Layer Request to Physical Layer to exit L1, L2 |
| Lp_Disable | Link Layer Request to Physical Layer to disable PHY |

As noted in Table 1, in some implementations, an alignment mechanism can be provided through an AlignReq/AlignAck handshake. For example, when the physical layer enters recovery, some protocols may lose packet framing. Alignment of the packets can be corrected, for instance, to guarantee correct framing identification by the link layer.

Figure 12:
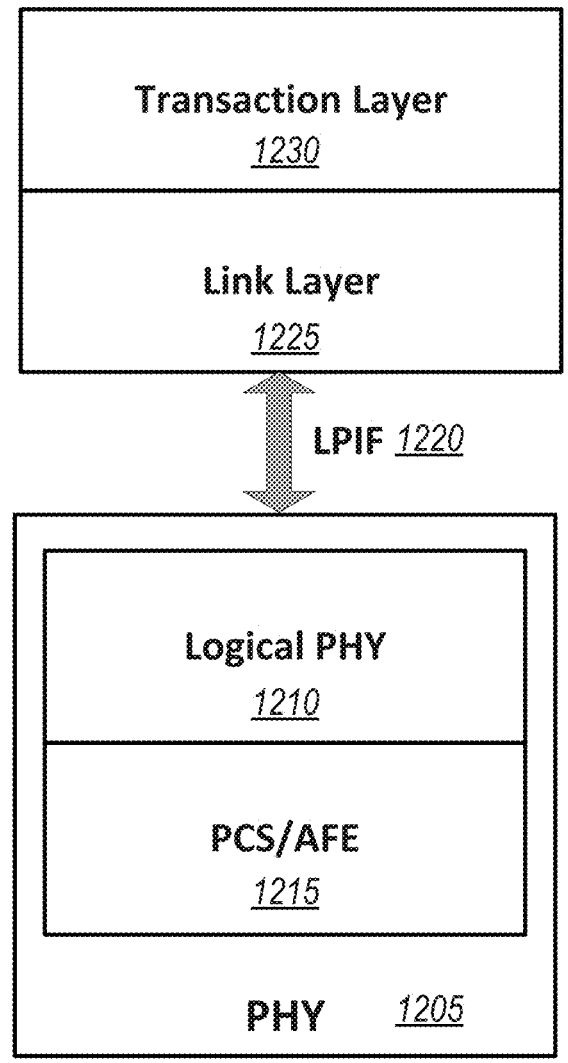
FIG. 12 is a simplified block diagram of an example MCPL LPIF.

Turning to FIG. 12, as noted above, the logical PHY to be implemented in a device supporting MCPL may include a defined logical PHY interface (LPIF) defining an interface between the MCPL PHY and the link layer of any one of a plurality of different protocols (e.g., PCIe, IDI, QPI, UPI, USB, etc.). FIG. 12 is a simplified block diagram 1200 illustrating an example of such an interface. For instance, the MCPL PHY 1205 may include a logical PHY 1210 and an analog front end (AFE)/physical coding sublayer (PCS) 1215. The MCPL PHY can interface via an LPIF 1220 with the link layers (e.g., 1225) (and thereby the transaction layers (e.g., 1230)) of other communication protocols.

The link layers of multiple communication protocols with varied characteristics may make use of the PHY provided through MCPL. In some implementations, a communication protocol to be used on an MCPL may be based on a link layer-to-physical layer interface incompatible with or otherwise different from the LPIF of MCPL. For instance, in one example, an MCPL LPIF 1220 may be based on The MCPL LPIF may be specification-defined common interface between a link layer and the MCPL logical PHY to facilitate interoperability, design and validation re-use between link layers of various protocols and the MCPL physical layer. In some implementations, the MCPL LPIF may adopt a push (or "free-put") model, where the link layer pushes link layer flits to the physical layer. Some communication protocols, however, may utilize different conventions for their link layer-PHY interface. As an example, Ultra Path Interconnect (UPI) uses a pull-based (or "avail-get") model. In the pull model, the PHY is to indicate to the link layer that there is an opportunity for a flit to be sent, and the PHY effectively "pulls" the flit from the link layer some predefined number of cycles (or UIs) later (e.g., 2 cycles). A push-based model, however, may allow the link layer to stage a flit, which results in the PHY placing the flit in a first-in-first-out (FIFO) queue and sends the flit on the link at the next opportunity.

Additional issues may arise when attempting to carry varied link layer traffic over an MCPL PHY. Continuing with the example of UPI, null flits may be defined to be sent, for instance, during idle periods, state transitions, and other instances. A rolling CRC and continued configuration may be facilitated through the sending of such null flits. MCPL, however, may not need or support null flits in some implementations, instead to send no data on the link (e.g., for power savings and other example benefits). Some state transitions may provide defined handshakes between the link layer and physical layer, and implementing such handshakes may further be complicated by a standardized LPIF designed to support multiple different communication protocols. In still other implementations, physical layer controls may be implemented in a communication protocol from how they are implemented using an MCPL PHY, among other example issues.

Figure 13:
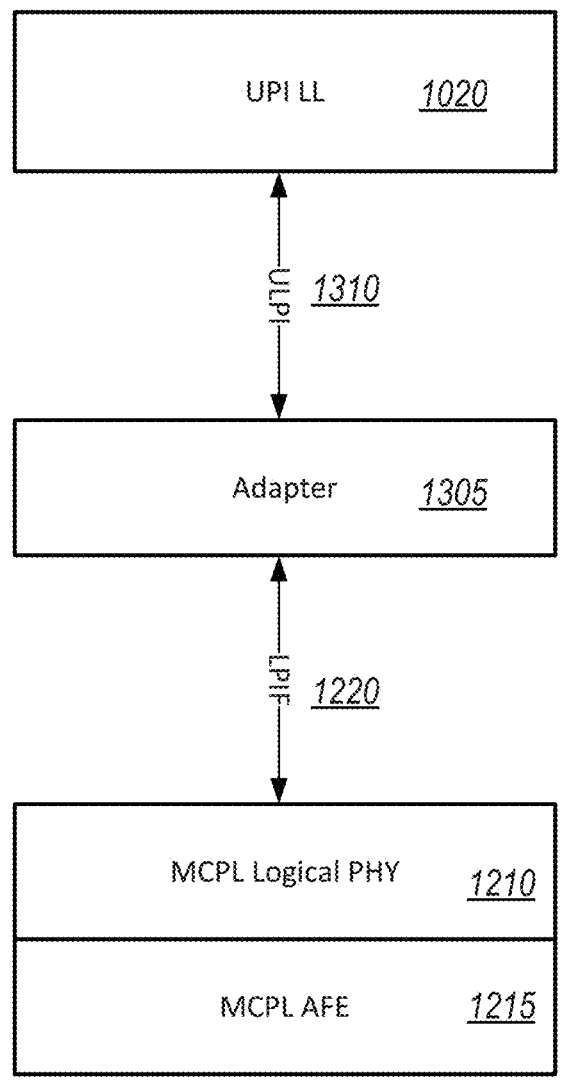
FIG. 13 is a simplified block diagram of an adapter for a link layer-to-physical layer interface.

At least some of the example issues discussed above may be addressed in some implementations, through a link layer-to-physical layer interface adapter (e.g., 1305) provided within a component supporting MCPL or provided as a separate component having hardware and/or software logic to implement the adapter 1305. For instance, turning to FIG. 13, a simplified block diagram 1300 is shown illustrating an example adapter 1305 to translate aspects of requests from a particular link layer (e.g., a UPI link layer 1020) sent over the protocol's defined interface (e.g., UPI's link layer-to-PHY interface (ULPI) 1310) into requests compatible with requests to be sent on the MCPL LPIF 1220. Likewise, an adapter 1305 may also translate aspects of messages sent from the MCPL PHY (tailored to LPIF 1220) to allow these to appropriately processed by the protocol's link layer (e.g., 1020) according to the link layer (LL)-PHY interface (e.g., ULPI 1310) defined for that corresponding protocol.

An interface adapter (e.g., 1305) may facilitate a variety of features to convert messaging over a first protocol's LL-PHY interface (e.g., 1310) to messaging compatible with the MCPL LPIF (and vice versa). In one example, an interface adapter 1305 may be configured to adapt the ULPI of UPI for MCPL. For instance, the adapter 1305 may adapt the pull-based model used in ULPI to the push-centric model in LPIF. A UPI to MCPL (or U2R) adapter may further address the use of NULL flits in UPI, for instance, by preserving the power savings features of MCPL by detecting and accepting the NULL flit from the UPI LL and preventing such NULL flits from being sent on the MCPL PHY. The U2R adapter 1305 may additionally manage the L1 entry handshake of UPI between the UPI LL 1020 and MPCL PHY 1210. The adapter 1305 may provide additional functionality, including managing physical layer control messaging over the interface between UPI LL and MCPL PHY, among other examples.

Figure 14:
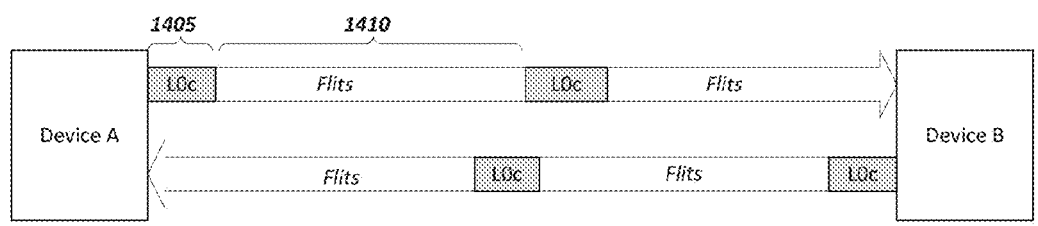
FIG. 14 illustrates a representation of an example control window embedded in a data stream.

UPI may provide for a mechanism for communicating physical layer control information and performing physical layer control tasks different from the physical layer packets defined to be sent over an MCPL. An adapter (e.g., 1305) may additionally assist in addressing asynchronies between physical layer control implementations of MCPL and the protocols running above. For instance, in UPI, while in a transmitting link state (TLS) (e.g., L0), the UPI physical layer may be provided limited opportunities to perform control tasks. For instance, bit errors and other errors may be identified on one or more lanes during an L0 state. In one implementation, a control state L0c can be provided in which physical layer control tasks may be performed. For instance, the L0c state can be provided as a periodic window within the TLS to allow Physical layer control messages to be sent between streams of flits sent through the Link layer. For instance, as represented in the example illustrated in FIG. 14, an L0 state can be subdivided into L0c intervals. These intervals may be defined to occur at recurring, predictable intervals. Each L0c interval can begin with a L0c state or window (e.g., 1405) in which Physical layer control codes and other data can be sent. The remainder (e.g., 1410) of the L0c interval can be dedicated to the sending of flits. The length of the L0c interval and L0c state in each interval can be programmatically defined, for instance by BIOS of one or more devices or another software-based controller, among other examples. The L0c state can be considerably shorter than the remainder of an L0c interval. For instance, in one example, the L0c can be 8UI while the remainder of the L0c interval is on the order of 4KUI, among other examples. This can allow windows in which relatively short, predefined messages can be sent without substantially disrupting or wasting link data bandwidth.

Figure 15:
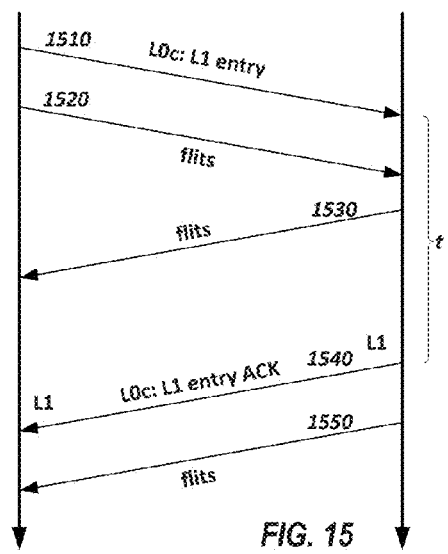
FIG. 15 illustrates a flow diagram of an example handshake.

L0c state messages can communicate a variety of conditions at the Physical layer level. In one example, one device can initiate a reset of the link or a lane, for instance, based on bit errors or other errors in excess of a particular threshold amount. Such errors can also be communicated in L0c windows (such as preceding L0c windows). The L0c state can also be leveraged to realize other in-band signaling, such as signaling for use in aiding or triggering transitions between other link states. In one example, L0c messages can be utilized to transition a link from an active L0 state to a standby or low power state, such as an L1 state. As shown in the simplified flow diagram of FIG. 15, a particular L0c state can be used to communicate a L1 entry request (e.g., 1510). Further flits (e.g., 1520, 1530) can be sent while the device (or agent on the device) waits for an acknowledgement of the request 1510. The other device on the link can send the acknowledgement (e.g., 1540). In some examples, the acknowledgement can also be sent in an L0c window. In some instances, the acknowledgement can be sent in the next L0c window following receipt/sending of the L1 request 1510. Timers can be employed (in the PHY) to synchronize the L0c intervals at each device and the requesting device can identify the acknowledgement 1540 as an acknowledgement of the request 1510 (e.g., rather than an independent L1 entry request) based on an identification that the acknowledgement 1540 was sent at the next L0c window, among other examples. In some instances, an acknowledgement can be communicated through an L0c code distinct from that used in the L1 entry request 1510. In other instances, the acknowledgement 1540 can include the echoing of the L1 entry request code used in request 1510, among other examples. Further, in alternative examples, a non-acknowledge signal or NAK can be communicated in the L0c window.

In addition (or as an alternate) to handshaking using L0c codes, supersequences, such as Detect supersequence, can be sent in connection with resetting and re-initializing the link. Further handshaking can occur between the devices as the supersequences sent by a first device and echoed by the second, receiving device. Supersequences can be used, as described above, to assist in the reinitialization of the link including debouncing, bit lock, byte lock, descrambling, and deskewing the lanes of the link. Further, the devices can utilize the timer (e.g., embodying the L0c interval) to synchronize entry of the devices and the link into the requested L1 state. For instance, receipt of the acknowledgement 1540 can indicate to the devices that they are to mutually enter (or begin entering) the L1 state at the end of the L0c interval corresponding to the L0c window in which the acknowledgement was sent, among other examples. For instance, data sent in an L0c window included in or otherwise associated with the acknowledgement 1540 can indicate the time at which the devices are to enter the L1 state, among other potential examples. Additional flits (e.g., 1550), in some instances, can be sent while the devices await the timeout corresponding to the transition into the L1 state, among other example uses of the L0c state. The predictable nature of the L0c state (i.e., where physical layer control messages are sent according to a predetermined schedule) may be a departure from the mechanism employed in MCPL (e.g., physical layer packets (PLPs)), which may be sent unpredictably at any time.

Figure 16:
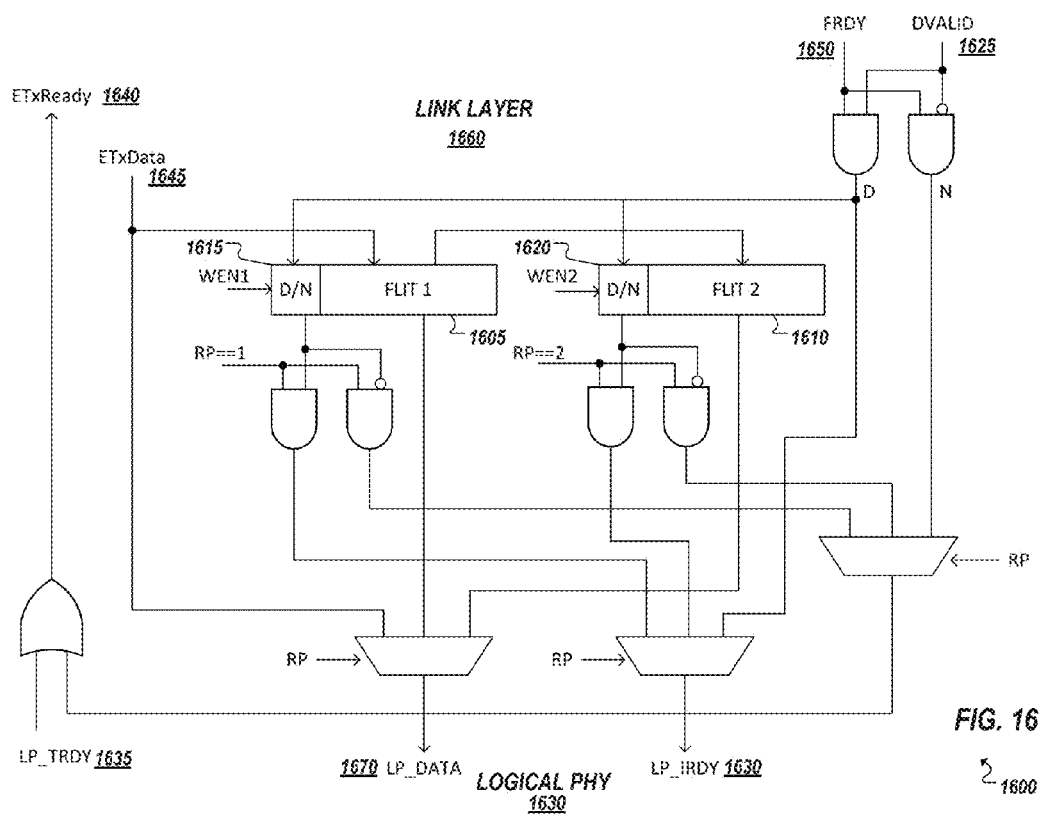
FIG. 16 is a simplified block diagram of an example adapter.

Turning to FIG. 16, a simplified block diagram 1600 is shown illustrating example logic for implementing at least a portion of an interface adapter to provide conversions from a first LL-PHY interface based on a pull model (e.g., ULPI) to the LPIF push-based model. In one example, a U2R adapter may be provided with a synchronous design that runs on the clock (LCLK) (e.g., a 8UI clock or clock cycle) that also clocks the supported LL and the MCPL logical PHY. A common reset signal (LRST) can reset the adapter and also serve to reset the supported LL and the MCPL logical PHY. LRST may be asserted on Cold (power-good) reset for example. In one example, adaption along the receive path (i.e., from the MCPL PHY to the supported LL (e.g., UPI LL) by the adapter may be simple, particularly where virtual and physical lane numbers are equal. For instance, in the case of a U2R adapter, a 24 lane LPIF implementation of the MCPL may provide a 192 bit flit (pl_data) with valid (pl_valid) on every LCLK since L0c of UPI is not provided (or needed) in the MCPL PHY, with PLPs instead being used. Indeed, in some cycles, there may be no flits to send, and such periods may be simply indicated by de-asserting the MCPL valid signal.

In the example of FIG. 16, a set of "n" shift registers (e.g., 1605, 1610) are provided to synthesize a delay provided by a particular pull-based protocol (e.g., UPI) from an indication that the PHY is ready for a LL flit, to the pulling of the flit for delivery on the link. The number of n registers can correspond to the number "n" cycles for the delay. For instance, in the example of FIG. 16, 2 shift registers are provided to synthesize a 2 cycle delay present in an implementation of UPI. In an implementation where the particular protocol supports the sending of NULL flits generated by its link layer (such as in UPI), the default value (e.g., after reset) of each of the shift registers may be NULL flits. Each register may also be provided with a tag bit (e.g., 1615, 1620) to indicate whether the register currently stores a Data or NULL flit (e.g., as detected by the adapter). This information may be provided with the flit by the UPI link layer via a DVALID signal 1625. Write pointer (WEN) and read pointer (RP) track where each flit is written to and read from.

In the example of FIG. 16, LP_IRDY 1630 is the initiator ready signal and PL_TRDY 1635 is the target ready signal for use in a push-based model of the MCPL LPIF. Link layer flits may be sent when the initiator (the link layer) indicates that flits are ready via the LP_IRDY 1630 signal within the LPIF and the target (the PHY) also indicates it is ready to handle the flits (as indicated through PL_TRDY 1635). In a push model, the link layer may push flits, irrespective of the readiness of the PHY, with flits backfilling in the event the PHY does not have openings to send the flits. Within the pull-based model of an LL-PHY interface of the protocol (e.g., UPI) that is to use the MCPL PHY, similar signals may be provided as defined within the LL-PHY interface. For instance, within an example ULPI, ETxReady 1640 corresponds to the LPIF PL_TRDY and indicates the request of the PHY to pull a flit on ETxData 1645 some number of cycles (e.g., 2, as defined in the example pull-based protocol's implementation) later. A flit ready (FRDY) signal may be provided in the adapter to indicate that a flit is ready, based on signals received from the ULPI, with DVALID distinguishing data flits generated by the link layer 1660 from NULL flits. If flits are not dropped (and sent as LL-PHY data 1670), LP_IRDY 1630 stays asserted as required for the push model. When the PHY is sending physical layer control messages (e.g., through a PLP) the PL_TRDY 1635 may be deasserted for 1 cycle while LP_IRDY 1630 stays asserted. It is assumed that such deassertions will be spaced at least 'n+1' cycles apart, although some implementations (such as discussed in FIG. 19 below) may support back-to-back PLPs. Flits are passed from ULPI (of link layer 1660) to LPIF (of logical PHY 1665) with zero latency except during such PL_TRDY 1635 deassertion, which may produce a predetermined amount of delays (e.g., delay 3 flits by a cycle), among other example features.

Figure 17:
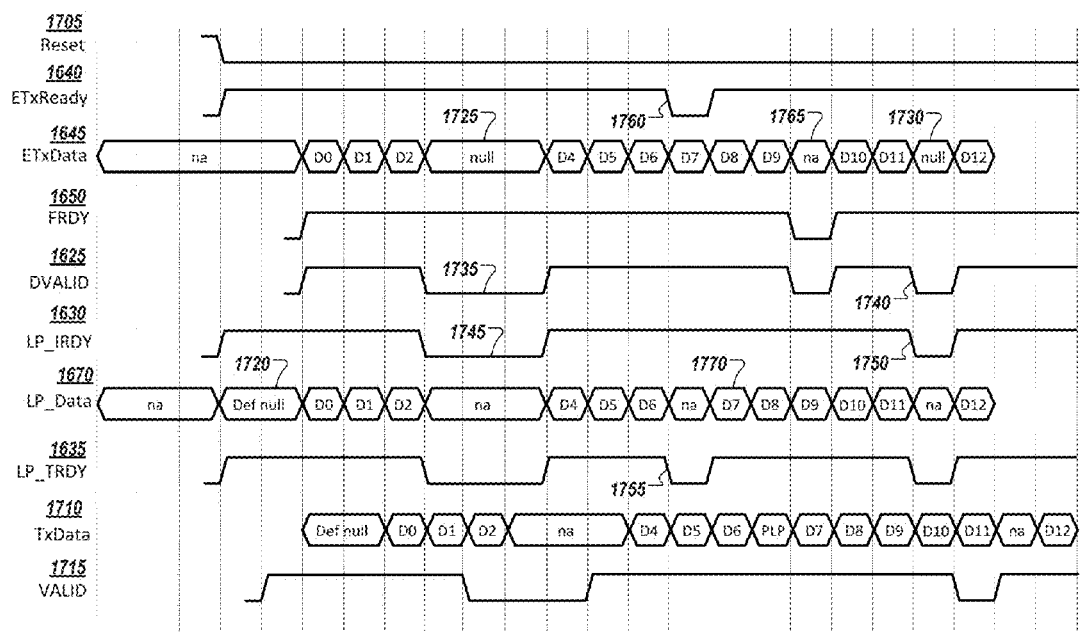
FIGS. 17-19 illustrates an example uses of a link layer-to-physical layer interface including an adapter.

FIG. 17 illustrate example signaling in connection with an example interface adaptor to enable a LL-to-PHY interface, where the link layer utilizes a pull-based interface and the PHY utilizes a push-based interface, such as described in the example of FIG. 16. For instance, in this particular example, the link layer is to stage flits at a particular cycle delay following an indication from a PHY (e.g., ETxReady) that it is available to send the flits. Indeed, in the example of FIG. 17, a reset signal 1705 is deasserted to allow data to flow from the link layer to the PHY. The adapter may cause a synthesized ETxReady 1640 to be asserted at the ULPI triggering the pulling of a stream of data on ETxData 1645 generated by the UPI link layer two cycles following the assertion of ETxReady 1640. To synthesize this delay on the adapter, the shift registers (e.g., 2 registers with a defined null value (e.g., at 1720) corresponding to a synthesized 2 cycle delay) may be emptied at the assertion of ETxReady 1640. For instance, when reset 1705 is deasserted, LP_IRDY 1630 and LP_TRDY 1635 may be automatically asserted. Rather than delivering data (D0-D12) immediately in accordance with the assertions of LP_IRDY 1630 and LP_TRDY 1635, the 2 cycle delay is achieved by queuing data D0-D12 behind two cycles worth of null data 1720, causing the data to be pushed to the MCPL PHY 2 cycles (behind the defined null data 1720), in accordance with what is expected by the link layer.

To determine whether data received from the link layer (over the UPLI and adapter) should be actually transmitted on the MCPL, the adapter can determine whether the data is valid and/or corresponds to physical layer control messages that are to be sent. For instance, the flit ready FRDY signal 1650 may indicate the window in which flits are to be sent in accordance with the link layer. The DVALID signal 1625 can be set in accordance with the adapter's inspection of the link layer flits (in ETxData 1645) to indicate whether the flit is of a kind to be sent on the PHY. For instance, in the example of UPI, NULL flits may be sent in the flits of ETxData 1645, but the MCPL PHY may be configured to not send such flits. For instance, an adapter may be provided, which is adapted to drop the NULL flits from transmission on the MCPL (in 1710). In other examples, the adapter may allow NULL flits for transmission.

Continuing with the example of FIG. 17, NULL flits (e.g., 1725, 1730) may detected by the adapter. In response, the adapter may cause the DVALID signal 1625 to be deasserted (e.g., at 1735, 1740) to indicate that the NULL flit is of a type to be dropped before being transferred from the link layer to the MCPL PHY (on 1670). The adapter logic may generate a synthesized LP_IRDY signal based on the DVALID 1625 (and FRDY 1650) signals generated from the ETxReady 1640 and ETxData 1645 signals from the link layer. When the LP_IRDY signal 1630 is asserted, and the LP_TRDY signal 1635 is also asserted, the LL flits (e.g., D0-D12) from ETxData 1645 may be sent (at LP_Data 1710) onto the MCPL PHY. Deasserting LP_IRDY 1630, on the other hand, causes NULL flits to be dropped. However, although the adapter causes LP_IRDY 1630 to be deasserted (e.g., 1745, 1750) upon detecting NULL flits (e.g., 1725, 1730), it should be noted that the native initiator ready signal of the source link layer, ETxReady, remains asserted. The data (at LP_DATA 1670) can be processed at the MCPL PHY to generate a corresponding valid signal 1715, which is to indicate, one cycle in advance of the transmitted data 1710 (delayed subject to the internal latency of the PHY), whether a next cycle will include valid data or invalid data (e.g., a dropped NULL, which should be ignored).

An interface adapter may additionally detect physical layer control events. In one example, in each of the pull- and push-based interface models, a PHY may drive the introduction of a physical layer control task. In UPI, as noted above, L0c windows may be utilized, which occur at predictable intervals. In an example of an MCPL may send a PLP at potentially any time. In the case of UPI, the UPI LL does not natively anticipate physical layer control events. However, for a protocol using a pull-based interface model, as with UPI, the link layer is accustomed to having the PHY as its master. Accordingly, as illustrated in the example of FIG. 17, a PHY of the MCPL may initiate a PLP by simply deasserting (e.g., at 1755) LP_TRDY 1635. For a protocol using a pull-based interface, the deassertion of a ready signal 1635 by the PHY may automatically cause the LL ready signal (e.g., ETxReady 1640) to also be deasserted (at 1760). The deassertion of the ETxReady 1640 may not be reflected on the interface for a predetermined number of cycles (e.g., 2 cycles in this example). Further, while the link layer has already staged data (e.g., D7 in ETxData 1645), the link layer's 2 cycle delay results in three flits being delayed a cycle and empty data appearing 3 cycles later to form a "hole" in the ETxData 1645 data stream. This hole allows for the stream to "catch back up" after the deassertion (at 1755, 1760).

As noted above, LP_TRDY 1635 and ETxReady 1640 are deasserted to allow the PHY to pause LL flits to send physical layer control data. When this happens, link layer traffic is backfilled in the adapter's shift registers, such that when LP_TRDY 1635 (and ETxReady 1640) are reasserted, the adapter provides link layer data from its shift registers (in LP_DATA 1670 at 1770) rather than directly from the link layer stream ETxData 1645 to resume the transmission of data flits at the point at which the deassertion of LP_TRDY 1635 occurred. The resulting transmission (TxData 710) is the stream of data flits D4-D6, followed by a PLP (corresponding to the deassertion of LP_TRDY 1635), and then data flits D7-D11 (until another NULL flit 1730 is transmitted).

Figure 18:
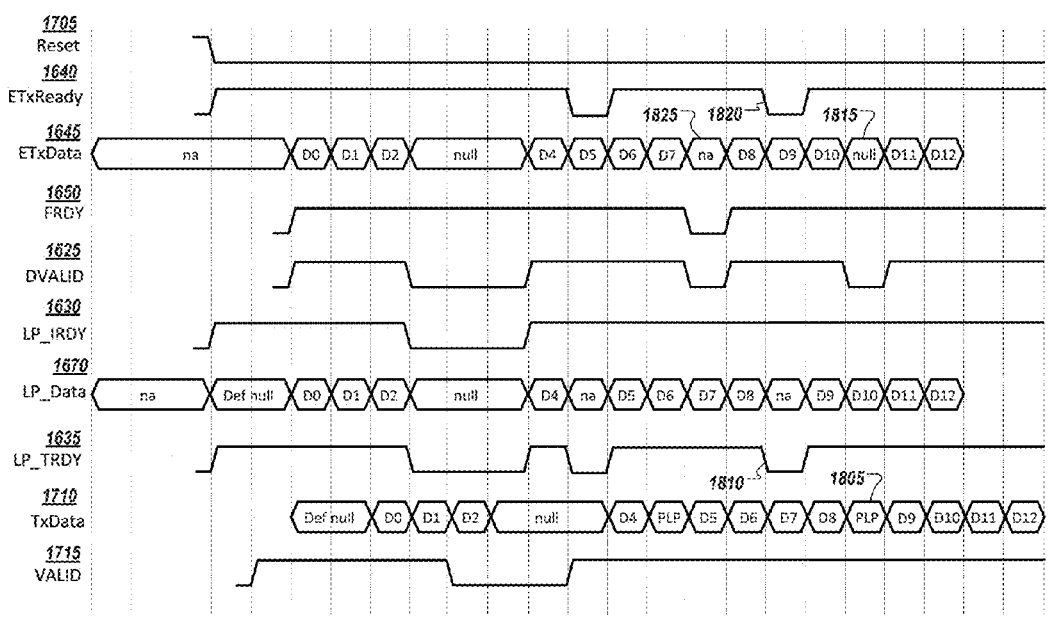

In the example of FIG. 17, transmission of a PLP resulted in the link layer creating a hole in its stream to allow the shift registers to be emptied and "real time" link layer data to resume being transmitted some number of cycles following the PLP. In some cases, if a NULL flit is sent and detected as being sent within a number of cycles of the PLP, the NULL may form the "hole" needed to allow the link layer data to catch up. For instance, in the example of FIG. 18, a PLP 1805 is to be sent, such that LP_TRDY 1635 is deasserted (at 1810). As in the previous example, this causes ETxReady 1640 to also be automatically deasserted (at 1820). Ordinarily, in this example implementation (defining a 2 cycle delay from the assertion of LP_TRDY to the pulling of ETxData 1645) an empty set of data (e.g., "na" data) will follow three cycles after the deassertion of ETxReady 1640. However, in the example of FIG. 18, a NULL flit 1815 arrives three cycles after the deassertion of ETxReady 1640, which in turn creates an equally acceptable hole through which data flits (e.g., D9-D11) stored in the adapter shift registers may be released to allow the feeding of live link layer data to the PHY.

Figure 19:
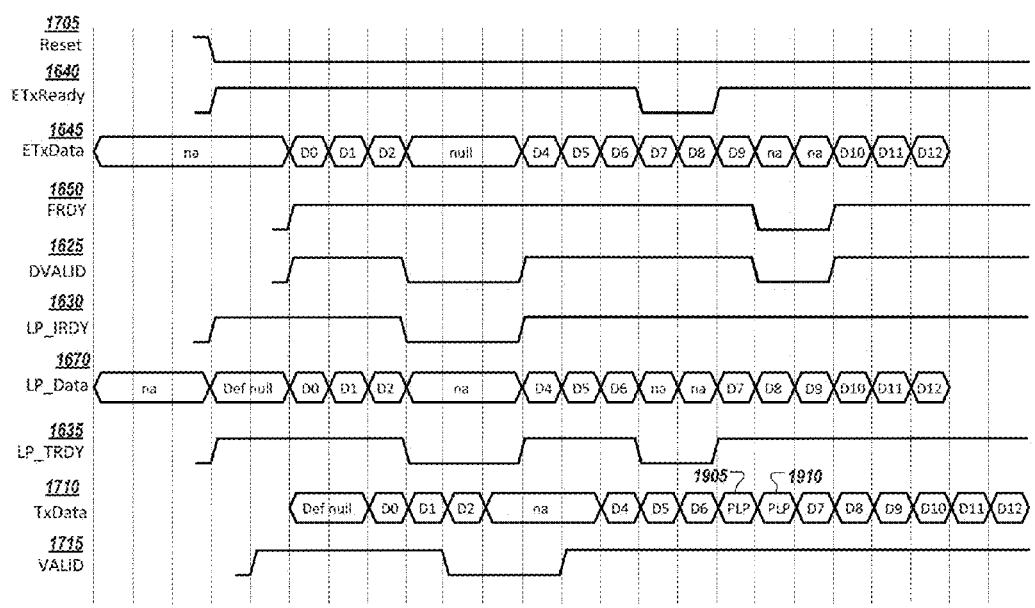

FIG. 19 illustrated another example, showing an example where two consecutive PLPs 1905, 1910 may be sent. In this example, two shift registers are again maintained by an adapter providing sufficient storage (during the backfilling of LL data during the sending of the PLPs) to allow up to two consecutive PLPs to be sent, with LL data stored in the shift registers being allowed to emerge on the link following the PLPs, as shown in FIG. 19. It should be noted that any LL data may be stored in the adapter registers. For instance, data or NULL flits may be stored in the registers in connection with a deassertion of LP_TRDY 1635 and ETxReady 1640.

Figure 20:
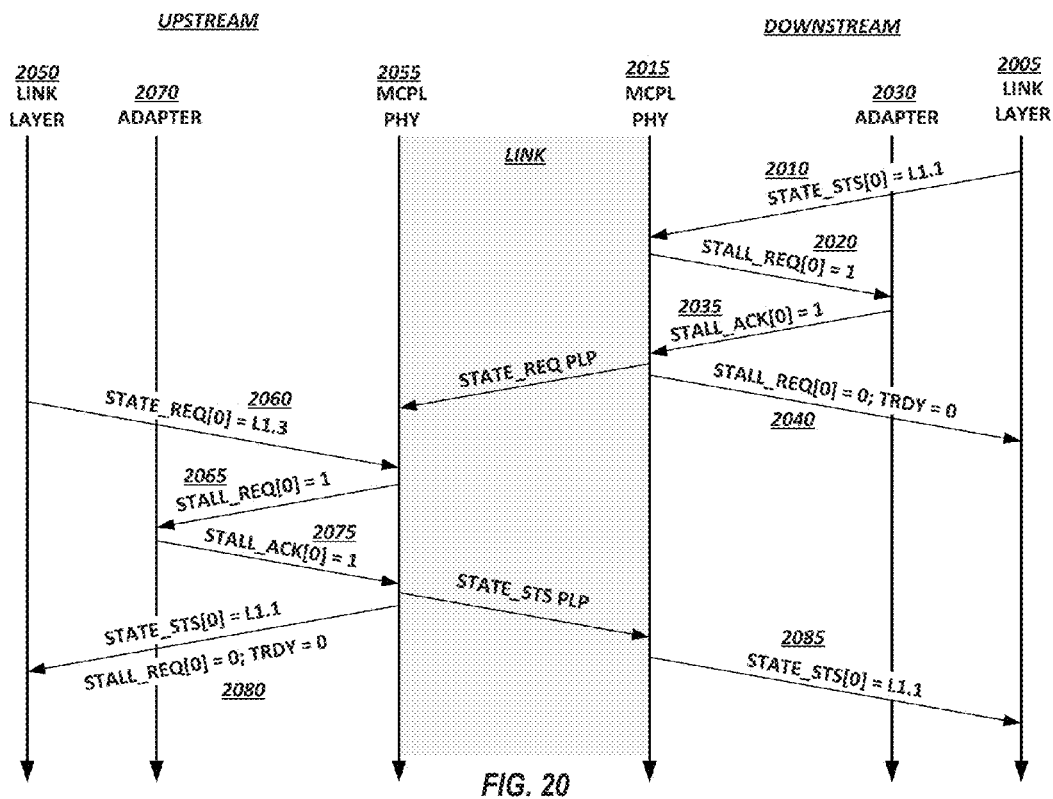
FIG. 20 illustrates an example use of an adapter to facilitate a handshake of a link layer-to-physical layer interface.

Turning to FIG. 20, another example 2000 is provided of the use of an interface adapter to enable handshakes involving link layers and PHY layers, which may be at least partially disrupted by an MCPL implementation with incompatibilities between a link layer running on top of the MCPL PHY and MCPL PHY. For instance, in some instances, a handshake may be performed over a LL-PHY interface in connection with a state change, such as a change in link power state. As an example, a downstream link layer 2005 (e.g., a UPI link layer) may initiate entry into a low power (e.g., L1) state. For instance, the link layer 2005 may send a state transition request 2010 to the downstream PHY. In ordinary cases, this handshake is unremarkable and handled without incident, but in the case of an MCPL PHY, messages sent by the link layer 2005 to the MCPL PHY 2015 or messages sent by the PHY 2015 to the link layer 2005 may not conform with what is expected in the handshake. For instance, in the illustration of FIG. 20, the MCPL PHY 2015 may receive an L1 entry request 2010 and respond according to its native conventions, namely with a Stall request 2020 included in a Stall request (REQ)/acknowledgment (ACK) exchange. The Stall request 2020, however, may be unexpected by the link layer 2005.

In one implementation, an interface adapter 2030 may be provided, such as described above, to adapt an LPIF of the PHY 2015 with the LL-PHY interface (e.g., ULPI) of the link layer 2005 (e.g., a UPI link layer). For instance, the adapter 2030 may intercept requests made by either the link layer 2005 or PHY 2015 and identify instances where the adapter is to intervene to ensure a handshake proceeds in a manner compatible to both the link layer and the MCPL PHY. For instance, in the example of FIG. 20, the adapter 2030 intercepts the Stall REQ 2020 and generates a synthesized version of the Stall ACK 2035 expected by the PHY 2015, which the PHY 2015 interprets as originating from the link layer in response to the Stall REG 2020. In response to the Stall ACK 2035, the MCPL PHY 2015 may generate a Stall request 2040 indicating that entry into L1 is to proceed and deassert its target ready (TRDY) signal. In this example, the adapter 2030 allows the TRDY signal to be propagate to the link layer, while the Stall request 2040 is filtered out by the adapter 230.

A similar workflow may proceed at an upstream link layer 2050 and MCPL PHY 2055, as shown further in the example of FIG. 20. A L1 entry request 2060 may be sent from the link layer 2050 to the PHY 2055, with the PHY responding with a Stall request 2065 that is intercepted by an interface adapter 2070, which generates a synthesized Stall ACK 2075 in response. In this example, L1 may only be entered when both the downstream and upstream components request to enter L1. Completion of the downstream handshake may result in a state transition request 2080 being sent over the link from the downstream component to the upstream component. When the upstream component likewise attempts to enter L1, the link's entry into L1 may be completed. Accordingly, in response to the synthesized Stall ACK 2075, a STATE_STS acknowledgement 2080 may be communicated to the link layer to confirm entry into L1. The upstream and downstream components may complete a handshake of their own, resulting in L1 transition confirmation (STATE_STS) also being communicated (at 2085) to the link layer 2005 by the PHY 2015 over the adapter 2030. An adapter 2030, 2070 may provide other translations, filtering, interceptions, and handshake synthesizing, beyond those described in this limited example, in accordance with the protocol at issue and the corresponding logic implemented in the adapter, among other example features.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 21:
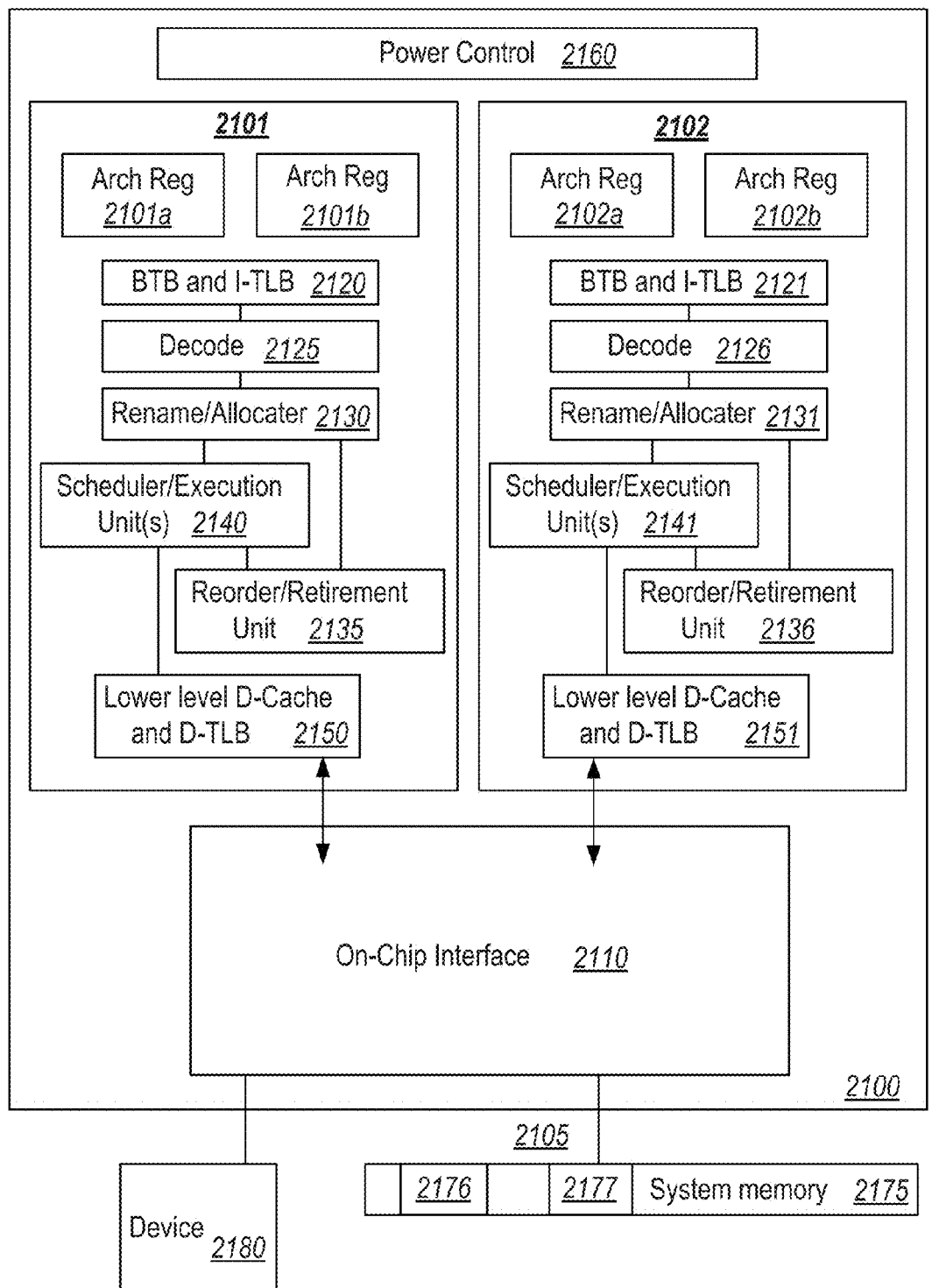
FIG. 21 illustrates an embodiment of a block diagram for a computing system including a multicore processor.

Referring to FIG. 21, an embodiment of a block diagram for a computing system including a multicore processor is depicted. Processor 2100 includes any processor or processing device, such as a microprocessor, an embedded processor, a digital signal processor (DSP), a network processor, a handheld processor, an application processor, a co-processor, a system on a chip (SOC), or other device to execute code. Processor 2100, in one embodiment, includes at least two cores—core 2101 and 2102, which may include asymmetric cores or symmetric cores (the illustrated embodiment). However, processor 2100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 2100, as illustrated in FIG. 21, includes two cores—core 2101 and 2102. Here, core 2101 and 2102 are considered symmetric cores, i.e. cores with the same configurations, functional units, and/or logic. In another embodiment, core 2101 includes an out-of-order processor core, while core 2102 includes an in-order processor core. However, cores 2101 and 2102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 2101 are described in further detail below, as the units in core 2102 operate in a similar manner in the depicted embodiment.

As depicted, core 2101 includes two hardware threads 2101a and 2101b, which may also be referred to as hardware thread slots 2101a and 2101b. Therefore, software entities, such as an operating system, in one embodiment potentially view processor 2100 as four separate processors, i.e., four logical processors or processing elements capable of executing four software threads concurrently. As alluded to above, a first thread is associated with architecture state registers 2101a, a second thread is associated with architecture state registers 2101b, a third thread may be associated with architecture state registers 2102a, and a fourth thread may be associated with architecture state registers 2102b. Here, each of the architecture state registers (2101a, 2101b, 2102a, and 2102b) may be referred to as processing elements, thread slots, or thread units, as described above. As illustrated, architecture state registers 2101a are replicated in architecture state registers 2101b, so individual architecture states/contexts are capable of being stored for logical processor 2101a and logical processor 2101b. In core 2101, other smaller resources, such as instruction pointers and renaming logic in allocator and renamer block 2130 may also be replicated for threads 2101a and 2101b. Some resources, such as re-order buffers in reorder/retirement unit 2135, ILTB 2120, load/store buffers, and queues may be shared through partitioning. Other resources, such as general purpose internal registers, page-table base register(s), low-level data-cache and data-TLB 2115, execution unit(s) 2140, and portions of out-of-order unit 2135 are potentially fully shared.

Processor 2100 often includes other resources, which may be fully shared, shared through partitioning, or dedicated by/to processing elements. In FIG. 21, an embodiment of a purely exemplary processor with illustrative logical units/resources of a processor is illustrated. Note that a processor may include, or omit, any of these functional units, as well as include any other known functional units, logic, or firmware not depicted. As illustrated, core 2101 includes a simplified, representative out-of-order (OOO) processor core. But an in-order processor may be utilized in different embodiments. The OOO core includes a branch target buffer 2120 to predict branches to be executed/taken and an instruction-translation buffer (I-TLB) 2120 to store address translation entries for instructions.

Core 2101 further includes decode module 2125 coupled to fetch unit 2120 to decode fetched elements. Fetch logic, in one embodiment, includes individual sequencers associated with thread slots 2101*a*, 2101*b*, respectively. Usually core 2101 is associated with a first ISA, which defines/specifies instructions executable on processor 2100. Often machine code instructions that are part of the first ISA include a portion of the instruction (referred to as an opcode), which references/specifies an instruction or operation to be performed. Decode logic 2125 includes circuitry that recognizes these instructions from their opcodes and passes the decoded instructions on in the pipeline for processing as defined by the first ISA. For example, as discussed in more detail below decoders 2125, in one embodiment, include logic designed or adapted to recognize specific instructions, such as transactional instruction. As a result of the recognition by decoders 2125, the architecture or core 2101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 2126, in one embodiment, recognize the same ISA (or a subset thereof). Alternatively, in a heterogeneous core environment, decoders 2126 recognize a second ISA (either a subset of the first ISA or a distinct ISA).

In one example, allocator and renamer block 2130 includes an allocator to reserve resources, such as register files to store instruction processing results. However, threads 2101*a* and 2101*b* are potentially capable of out-of-order execution, where allocator and renamer block 2130 also reserves other resources, such as reorder buffers to track instruction results. Unit 2130 may also include a register renamer to rename program/instruction reference registers to other registers internal to processor 2100. Reorder/retirement unit 2135 includes components, such as the reorder buffers mentioned above, load buffers, and store buffers, to support out-of-order execution and later in-order retirement of instructions executed out-of-order.

Scheduler and execution unit(s) block 2140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 2150 are coupled to execution unit(s) 2140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 2101 and 2102 share access to higher-level or further-out cache, such as a second level cache associated with on-chip interface 2110. Note that higher-level or further-out refers to cache levels increasing or getting further way from the execution unit(s). In one embodiment, higher-level cache is a last-level data cache—last cache in the memory hierarchy on processor 2100—such as a second or third level data cache. However, higher level cache is not so limited, as it may be associated with or include an instruction cache. A trace cache—a type of instruction cache—instead may be coupled after decoder 2125 to store recently decoded traces. Here, an instruction potentially refers to a macro-instruction (i.e. a general instruction recognized by the decoders), which may decode into a number of micro-instructions (micro-operations).

In the depicted configuration, processor 2100 also includes on-chip interface module 2110. Historically, a memory controller, which is described in more detail below, has been included in a computing system external to processor 2100. In this scenario, on-chip interface 2110 is to communicate with devices external to processor 2100, such as system memory 2175, a chipset (often including a memory controller hub to connect to memory 2175 and an I/O controller hub to connect peripheral devices), a memory controller hub, a northbridge, or other integrated circuit. And in this scenario, bus 2105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 2175 may be dedicated to processor 2100 or shared with other devices in a system. Common examples of types of memory 2175 include DRAM, SRAM, non-volatile memory (NV memory), and other known storage devices. Note that device 2180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 2100. For example in one embodiment, a memory controller hub is on the same package and/or die with processor 2100. Here, a portion of the core (an on-core portion) 2110 includes one or more controller(s) for interfacing with other devices such as memory 2175 or a graphics device 2180. The configuration including an interconnect and controllers for interfacing with such devices is often referred to as an on-core (or un-core configuration). As an example, on-chip interface 2110 includes a ring interconnect for on-chip communication and a high-speed serial point-to-point link 2105 for off-chip communication. Yet, in the SOC environment, even more devices, such as the network interface, co-processors, memory 2175, graphics processor 2180, and any other known computer devices/interface may be integrated on a single die or integrated circuit to provide small form factor with high functionality and low power consumption.

In one embodiment, processor 2100 is capable of executing a compiler, optimization, and/or translator code 2177 to compile, translate, and/or optimize application code 2176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 22:
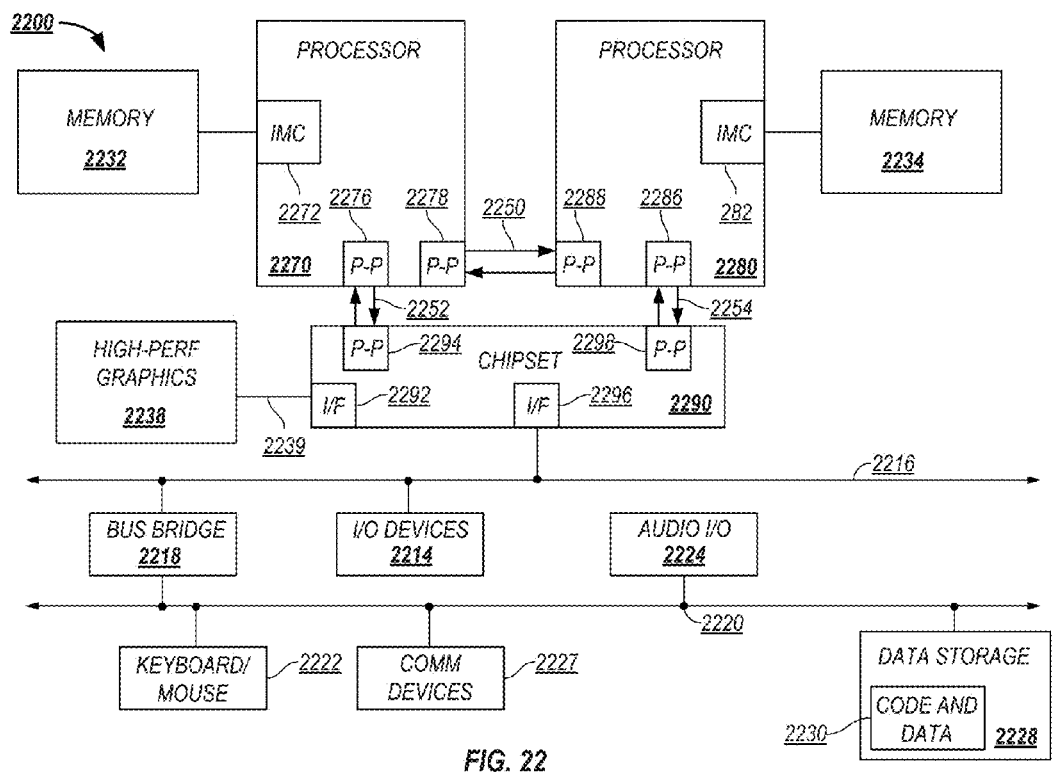
FIG. 22 illustrates an embodiment of a block for a computing system including multiple processors.

Referring now to FIG. 22, shown is a block diagram of a second system 2200 in accordance with an embodiment of the present invention. As shown in FIG. 22, multiprocessor system 2200 is a point-to-point interconnect system, and includes a first processor 2270 and a second processor 2280 coupled via a point-to-point interconnect 2250. Each of processors 2270 and 2280 may be some version of a processor. In one embodiment, 2252 and 2254 are part of a serial, point-to-point coherent interconnect fabric, such as a high-performance architecture. As a result, the invention may be implemented within the QPI architecture.

While shown with only two processors 2270, 2280, it is to be understood that the scope of the present invention is not so limited. In other embodiments, one or more additional processors may be present in a given processor.

Processors 2270 and 2280 are shown including integrated memory controller units 2272 and 2282, respectively. Processor 2270 also includes as part of its bus controller units point-to-point (P-P) interfaces 2276 and 2278; similarly, second processor 2280 includes P-P interfaces 2286 and 2288. Processors 2270, 2280 may exchange information via a point-to-point (P-P) interface 2250 using P-P interface circuits 2278, 2288. As shown in FIG. 22, IMCs 2272 and 2282 couple the processors to respective memories, namely a memory 2232 and a memory 2234, which may be portions of main memory locally attached to the respective processors.

Processors 2270, 2280 each exchange information with a chipset 2290 via individual P-P interfaces 2252, 2254 using point to point interface circuits 2276, 2294, 2286, 2298. Chipset 2290 also exchanges information with a high-performance graphics circuit 2238 via an interface circuit 2292 along a high-performance graphics interconnect 2239.

A shared cache (not shown) may be included in either processor or outside of both processors; yet connected with the processors via P-P interconnect, such that either or both processors' local cache information may be stored in the shared cache if a processor is placed into a low power mode.

Chipset 2290 may be coupled to a first bus 2216 via an interface 2296. In one embodiment, first bus 2216 may be a Peripheral Component Interconnect (PCI) bus, or a bus such as a PCI Express bus or another third generation I/O interconnect bus, although the scope of the present invention is not so limited.

As shown in FIG. 22, various I/O devices 2214 are coupled to first bus 2216, along with a bus bridge 2218 which couples first bus 2216 to a second bus 2220. In one embodiment, second bus 2220 includes a low pin count (LPC) bus. Various devices are coupled to second bus 2220 including, for example, a keyboard and/or mouse 2222, communication devices 2227 and a storage unit 2228 such as a disk drive or other mass storage device which often includes instructions/code and data 2230, in one embodiment. Further, an audio I/O 2224 is shown coupled to second bus 2220. Note that other architectures are possible, where the included components and interconnect architectures vary. For example, instead of the point-to-point architecture of FIG. 22, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

While the present invention has been described with respect to a limited number of embodiments, those skilled in the art will appreciate numerous modifications and variations therefrom. It is intended that the appended claims cover all such modifications and variations as fall within the true spirit and scope of this present invention.

Aspects of the embodiments can include one or a combination of the following examples:

Example 1 is system or apparatus including a link layer-to-physical layer interface adapter to identify a first ready signal from a first link layer-to-physical layer interface of a first communication protocol, where the first ready signal indicates readiness of a physical layer of the first protocol to accept link layer data for transmission on a link. The interface adapter is further to generate a second ready signal compatible with a second link layer-to-physical layer interface of a second communication protocol, where the second ready signal causes link layer data to be sent from a link layer of the second communication protocol according to a predefined delay. The interface adapter is further to generate a third ready signal compatible with the first link layer-to-physical layer interface to indicate to the physical layer of the first communication protocol that the link layer data is to be sent by the link layer of the second communication protocol, use a shift register to cause the link layer data to be passed to the physical layer according to the predefined delay, where the predefined delay includes a delay from assertion of the first ready signal to sending of the link layer data to the physical layer.

Example 2 may include the subject matter of example 1, where the delay includes a number of cycles.

Example 3 may include the subject matter of example 2, where the shift register includes a number of shift registers and the number of shift registers corresponds to the number of cycles.

Example 4 may include the subject matter of example 3, where the interface adapter includes circuitry and the circuitry includes the shift registers.

Example 5 may include the subject matter of any one of examples 1-4, where the first communication protocol provides for link layer NULL flits, and the interface adapter is further to detect NULL flits and data flits in the link layer data and cause the NULL flits to be dropped before proceeding to the physical layer.

Example 6 may include the subject matter of example 5, where the interface adapter is to deassert the third ready signal when NULL flits are detected to cause the NULL flits to be dropped.

Example 7 may include the subject matter of example 6, where deasserting the third ready signal causes the first ready signal to be deasserted.

Example 8 may include the subject matter of any one of examples 6-7, where the second link layer-to-physical layer interface generates a fourth ready signal to indicate that link layer data is ready and the fourth ready signal is to remain asserted when NULL flits are to be sent in the link layer data.

Example 9 may include the subject matter of any one of examples 6-8, where the interface adapter is to generate data valid signal to indicate whether link layer data supported by the first communication protocol is to be sent from the link layer to the physical layer, and deassertion of the third ready signal is based on the data valid signal.

Example 10 may include the subject matter of any one of examples 1-9, where transfer of link layer data from the link layer of the first communications protocol to a physical layer of the first communications protocol in the first link layer-to-physical layer interface is based on a push model, and transfer of link layer data from a link layer of the second communications protocol to the physical layer of the second communications protocol in the second link layer-to-physical layer interface is based on a pull model.

Example 11 may include the subject matter of any one of examples 1-10, where the physical layer is to cause a series of data windows to be provided in which the link layer data is to be sent over the link, and data of different communication protocols may be sent in consecutive data windows in the series.

Example 12 is a computer readable medium with executable instructions, apparatus, system, or method for identifying a first ready signal from a first link layer-to-physical layer interface of a first communication protocol, where the first ready signal indicates readiness of a physical layer of the first protocol to accept link layer data for transmission on a link, generating a second ready signal compatible with a second link layer-to-physical layer interface of a second communication protocol, where the second ready signal causes link layer data to be sent from a link layer of the second protocol according to a predefined delay, generating a third ready signal compatible with the first link layer-to-physical layer interface to indicate to the physical layer of the first protocol that the link layer data is to be sent by the link layer of the second communication protocol, and using a shift register to cause the link layer data to be passed to the physical layer according to the predefined delay, where the predefined delay includes a delay from assertion of the first ready signal to sending of the link layer data to the physical layer.

Example 12 is a system including a first component including a layered communication stack including a link layer of a first communication protocol and a physical layer of a different, second communication protocol, where transfer of link layer data to a physical layer is based on a pull model in the first communication protocol and based on a push model in the second communication protocol, and the first component further includes an interface adapter including a set of shift registers, where the adapter is to adapt one or more signals generated by a first link layer-to-physical layer interface of the first communication protocol for a second link layer-to-physical layer interface of the second communication protocol, adapt one or more signals generated by the second link layer-to-physical layer interface for the first link layer-to-physical layer interface, and cause transfer of link layer data from the link layer to the physical layer to be delayed in accordance with the second link layer-to-physical layer interface using the set of shift registers, where the layered communication stack is to send the link layer data to a second component over a link.

Example 14 may include the subject matter of example 13, where the physical layer is to define a series of data windows in which link layer data is to be sent on data lanes of the link.

Example 15 may include the subject matter of example 14, where the physical layer is further to send valid signals on the link to correspond to each of the series of data windows, and each valid signal indicates whether valid data is sent in a corresponding one of the series of data windows.

Example 16 may include the subject matter of example 15, where the physical layer is further to send stream identification signals on the link to correspond to each of the series of data windows, and each stream identification signal is to indicate a communication protocol of data sent in a corresponding one of the series of data windows.

Example 17 may include the subject matter of example 16, where the communication protocol is one of a plurality of different communication protocols, data of different communication protocols is to be sent in consecutive data windows, and the link layer of the first component includes a plurality of link layers corresponding to the plurality of different protocols.

Example 18 may include the subject matter of example 17, further including the second component, where the second component includes a layered protocol stack including the plurality of link layers and the physical layer.

Example 19 may include the subject matter of any one of examples 17-18, where a link layer-to-physical layer interface of another one of the plurality of link layers is compatible with the first link layer-to-physical layer interface.

Example 20 may include the subject matter of any one of examples 13-19, where the second communication protocol includes Ultra Path Interconnect (UPI).

Example 21 may include the subject matter of example 20, where the first communication protocol is based on Peripheral Component Interconnect Express (PCIe).

Example 22 may include the subject matter of any one of examples 13-21, where the first communication protocol provides for link layer NULL flits, and the interface adapter is further to detect NULL flits and data flits in the link layer data and cause the NULL flits to be dropped before proceeding to the physical layer.

Example 23 may include the subject matter of any one of examples 13-22, where the interface adapter is further to identify a physical layer control message to be sent to the second component, buffer the link layer data during the physical layer control message using the set of shift registers, and cause the link layer data to stop for a number of cycles corresponding to a number of cycles used to send the physical layer control message.

Example 24 may include the subject matter of example 23, where the physical layer control message includes a physical layer packet (PLP).

Example 25 may include the subject matter of any one of examples 13-24, further including a sideband channel to communicate state transition information between the first and second components Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a link layer-to-physical layer interface adapter to:
identify a first ready signal from a first link layer-to-physical layer interface of a first communication protocol, wherein the first ready signal indicates readiness of a physical layer of the first protocol to accept link layer data for transmission on a link;
generate a second ready signal compatible with a second link layer-to-physical layer interface of a second communication protocol, wherein the second ready signal causes link layer data to be sent from a link layer of the second communication protocol according to a predefined delay;
generate a third ready signal compatible with the first link layer-to-physical layer interface to indicate to the physical layer of the first communication protocol that the link layer data is to be sent by the link layer of the second communication protocol; and
use a shift register to cause the link layer data to be passed to the physical layer according to the predefined delay, wherein the predefined delay comprises a delay from assertion of the first ready signal to sending of the link layer data to the physical layer.

2. The apparatus of claim 1, wherein the delay comprises a number of cycles.

3. The apparatus of claim 2, wherein the shift register comprises a number of shift registers and the number of shift registers corresponds to the number of cycles.

4. The apparatus of claim 3, wherein the interface adapter comprises circuitry and the circuitry comprises the shift registers.

5. The apparatus of claim 1, wherein the first communication protocol provides for link layer NULL flits, and the interface adapter is further to detect NULL flits and data flits in the link layer data and cause the NULL flits to be dropped before proceeding to the physical layer.

6. The apparatus of claim 5, wherein the interface adapter is to deassert the third ready signal when NULL flits are detected to cause the NULL flits to be dropped.

7. The apparatus of claim 6, wherein deasserting the third ready signal causes the first ready signal to be deasserted.

8. The apparatus of claim 6, wherein the second link layer-to-physical layer interface generates a fourth ready signal to indicate that link layer data is ready and the fourth ready signal is to remain asserted when NULL flits are to be sent in the link layer data.

9. The apparatus of claim 6, wherein the interface adapter is to generate a data valid signal to indicate whether link layer data supported by the first communication protocol is to be sent from the link layer to the physical layer, and deassertion of the third ready signal is based on the data valid signal.

10. The apparatus of claim 1, wherein transfer of link layer data from the link layer of the first communications protocol to a physical layer of the first communications protocol in the first link layer-to-physical layer interface is based on a push model, and transfer of link layer data from a link layer of the second communications protocol to the physical layer of the second communications protocol in the second link layer-to-physical layer interface is based on a pull model.

11. A method comprising:
identifying a first ready signal from a first link layer-to-physical layer interface of a first communication protocol, wherein the first ready signal indicates readiness of a physical layer of the first protocol to accept link layer data for transmission on a link;
generating a second ready signal compatible with a second link layer-to-physical layer interface of a second communication protocol, wherein the second ready signal causes link layer data to be sent from a link layer of the second protocol according to a predefined delay;

generating a third ready signal compatible with the first link layer-to-physical layer interface to indicate to the physical layer of the first protocol that the link layer data is to be sent by the link layer of the second communication protocol; and using a shift register to cause the link layer data to be passed to the physical layer according to the predefined delay, wherein the predefined delay comprises a delay from assertion of the first ready signal to sending of the link layer data to the physical layer.

* * * * *